United States Patent
Schmitz et al.

(10) Patent No.: US 9,163,702 B2
(45) Date of Patent: Oct. 20, 2015

(54) SHIFTING DEVICE AND TRANSMISSION UNIT

(71) Applicant: Pinion GmbH, Denkendorf (DE)

(72) Inventors: Michael Schmitz, Niederelbert (DE); Christoph Lermen, Tholey (DE)

(73) Assignee: Pinion GmbH, Denkendorf (DE)

( * ) Notice: Subject to any disclaimer, the term of this patent is extended or adjusted under 35 U.S.C. 154(b) by 0 days.

(21) Appl. No.: 14/100,128

(22) Filed: Dec. 9, 2013

(65) Prior Publication Data

US 2014/0090500 A1      Apr. 3, 2014

Related U.S. Application Data

(63) Continuation of application No. PCT/EP2012/060530, filed on Jun. 4, 2012.

(30) Foreign Application Priority Data

Jun. 9, 2011   (DE) .................... 10 2011 106 107 U

(51) Int. Cl.
*F16H 3/08* (2006.01)
*F16H 3/10* (2006.01)
*B62M 11/06* (2006.01)
*B62M 11/14* (2006.01)
*F16H 3/091* (2006.01)
(Continued)

(52) U.S. Cl.
CPC ................. *F16H 3/10* (2013.01); *B62M 11/06* (2013.01); *B62M 11/145* (2013.01); *F16H 3/0915* (2013.01); *F16H 3/083* (2013.01); *F16H 2063/3096* (2013.01); *Y10T 74/19251* (2015.01)

(58) Field of Classification Search
USPC .................... 74/361, 363, 373, 375; 280/238
See application file for complete search history.

(56) References Cited

U.S. PATENT DOCUMENTS 2,086,563 A  *  7/1937  Lewis ............................ 74/363
3,889,547 A  *  6/1975  Sun et al. .................... 74/336 R
4,301,690 A  * 11/1981  Cavenagh ....................... 74/363
(Continued)

FOREIGN PATENT DOCUMENTS

CN           1093328 A      10/1994
DE    10 2008 064 51 A1     7/2010
(Continued)

OTHER PUBLICATIONS

International Search Report for application No. PCT/EP2012/060530, dated Sep. 6, 2012, 3 pages.

*Primary Examiner* — Ha D Ho
(74) *Attorney, Agent, or Firm* — Reising Ethington P.C.

(57) ABSTRACT

A shifting device for a transmission unit, in particular for a vehicle which is operated by muscle force is disclosed. The shifting device has a first partial transmission and a second partial transmission, which are connected in series for power transmission. The selecting devices of the first partial transmission are designed as selectable free-running clutches and the second partial transmission has a plurality of selectable gear stages. During shifting from a highest stage of the gear stages of the first partial transmission to a lowest stage of the gear stages of the first partial transmission, the free-running clutches of the two gear stages are actuated simultaneously, and a load change between the corresponding free-running clutches allows a shifting operation of the second partial transmission to a higher stage of the gear stages.

22 Claims, 13 Drawing Sheets

(51) Int. Cl.
   *F16H 63/30* (2006.01)
   *F16H 3/083* (2006.01)

(56) References Cited

U.S. PATENT DOCUMENTS

| | | | |
|---|---|---|---|
| 4,702,121 A | | 10/1987 | Hartmann |
| 5,667,233 A | * | 9/1997 | Metzinger .................... 280/238 |
| 5,689,998 A | | 11/1997 | Lee |
| 5,924,950 A | | 7/1999 | Pusic |
| 5,975,266 A | * | 11/1999 | Balhorn .......................... 192/64 |
| 2011/0251008 A1 | | 10/2011 | Schmitz et al. |

FOREIGN PATENT DOCUMENTS

| | | |
|---|---|---|
| ES | 2 217 929 | 11/2004 |
| JP | 54108169 | 8/1979 |
| JP | 2000514754 A | 11/2000 |
| JP | 2007210520 A | 8/2007 |
| WO | 9852817 A1 | 11/1998 |

\* cited by examiner

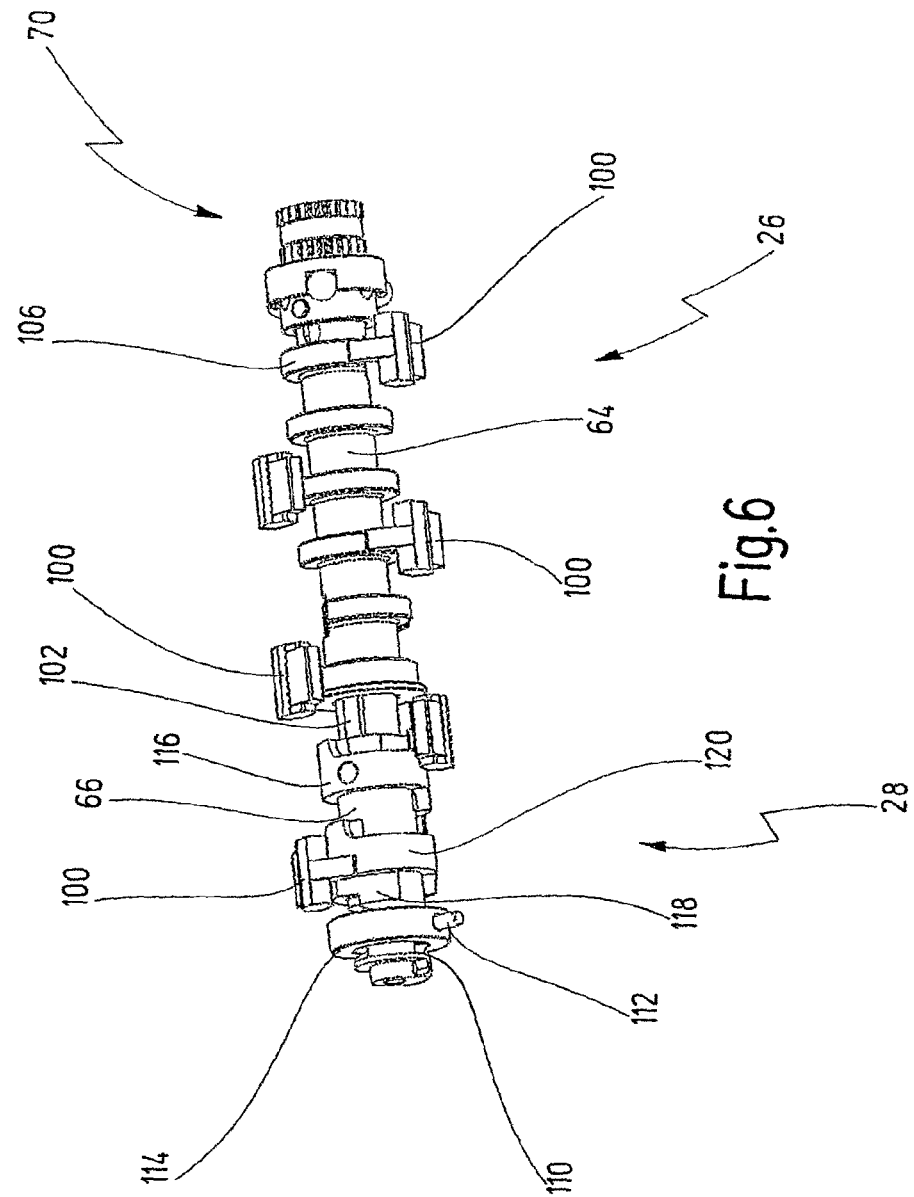

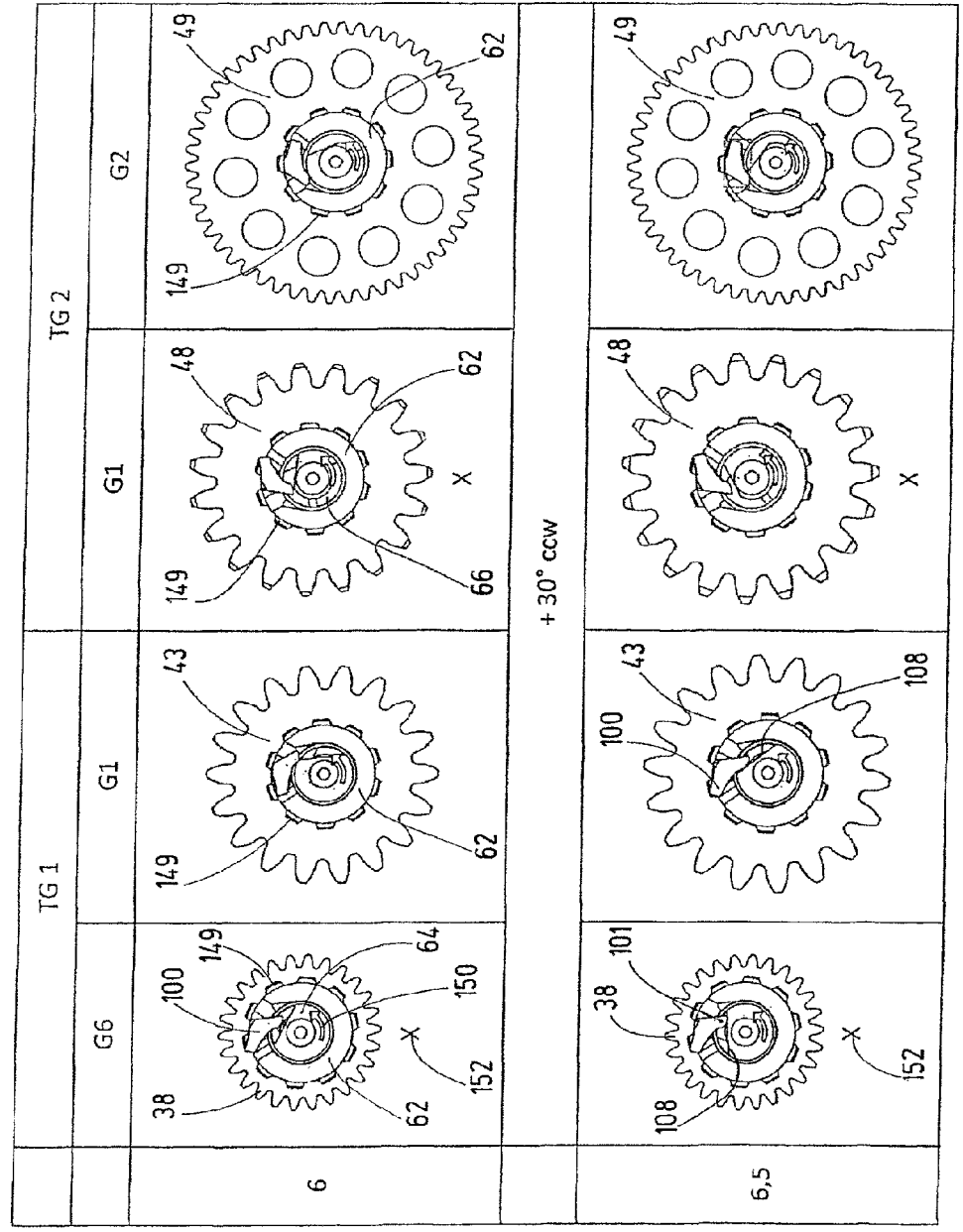

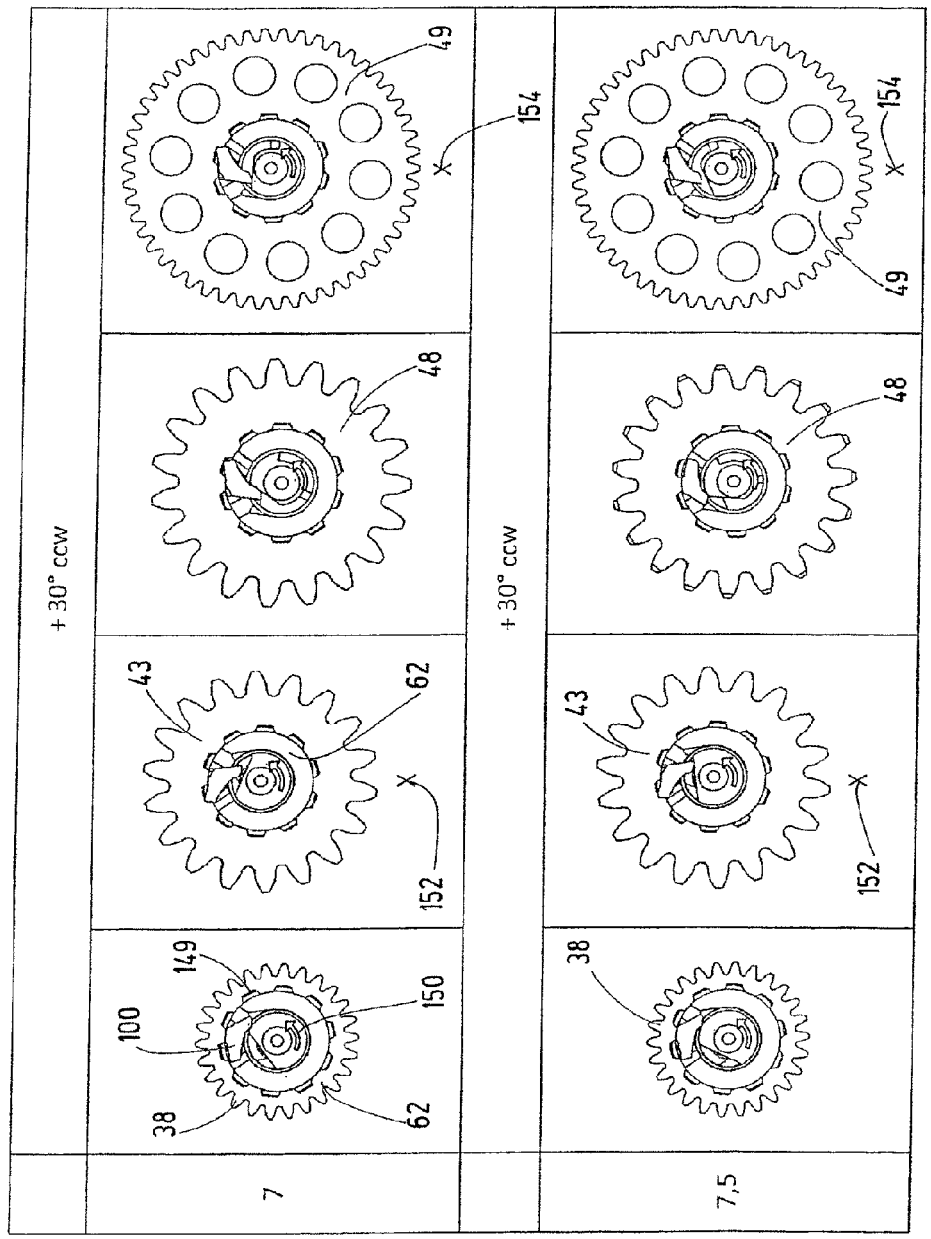

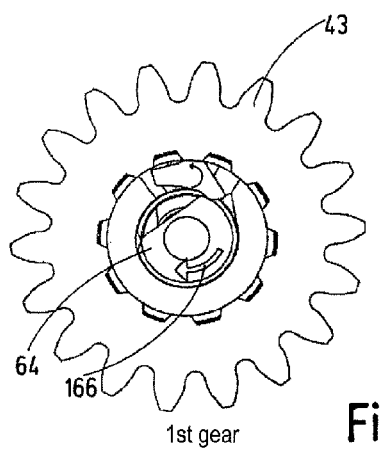
1. 2nd gear engaged
Fig.12a  1st gear
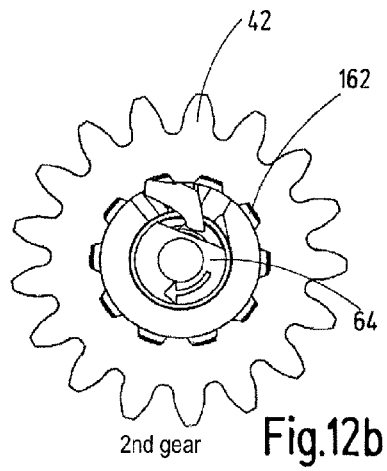
Fig.12b  2nd gear
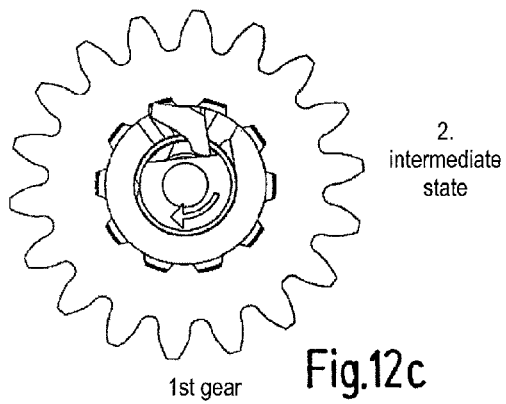
2. intermediate state
Fig.12c  1st gear
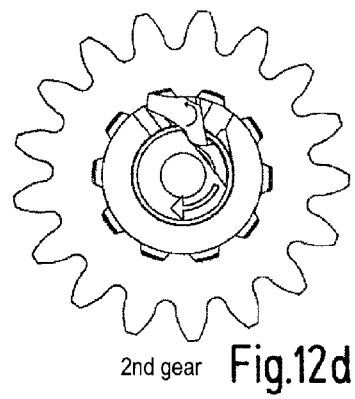
Fig.12d  2nd gear
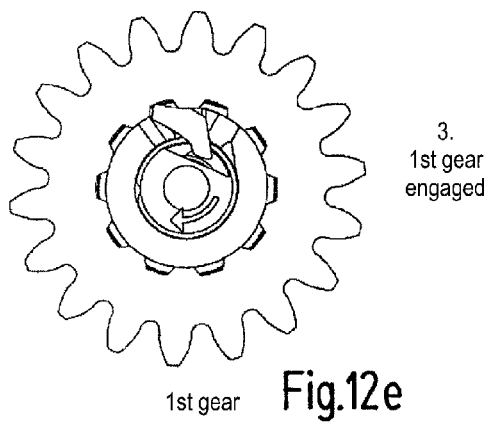
3. 1st gear engaged
Fig.12e  1st gear
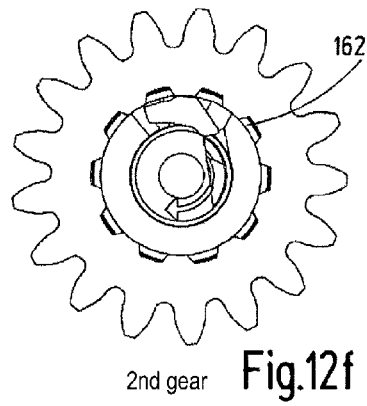
Fig.12f  2nd gear

SHIFTING DEVICE AND TRANSMISSION UNIT

CROSS-REFERENCE TO RELATED APPLICATIONS

This is a Continuation application of International patent application PCT/EP2012/060530, filed Jun. 4, 2012, which claims the priority of German patent application DE 10 2011 106 107, filed Jun. 9, 2011. The complete contents of these applications are hereby incorporated by reference.

BACKGROUND OF THE INVENTION

The invention relates to a shifting device for a transmission unit, in particular for a vehicle which is operated by muscle force, having a shaft, on which a plurality of loose wheels is mounted which, with a corresponding plurality of gearwheels, form wheel pairs of at least one partial transmission, wherein the shaft is formed as a hollow shaft and the loose wheels can be connected to the shaft by means of selecting means, wherein the selecting means can be actuated selectively by means of at least one camshaft mounted in the hollow shaft in order to form gear stages of the partial transmission.

The invention furthermore relates to a transmission unit, in particular for a vehicle driven by muscle force, having a shifting device of this kind.

Finally, the invention relates to a method for shifting the abovementioned shifting device.

Such shifting devices and transmission units are used to gear up or gear down driving force, in particular muscle force, and thereby make the vehicle easier to drive.

U.S. Pat. No. 5,924,950 A discloses a bicycle transmission of this kind. This bicycle transmission has an input shaft and a countershaft, wherein a plurality of driving wheels is mounted on the input shaft and a corresponding number of selectable driven wheels is mounted on the countershaft. The selectable gears on the countershaft are selected by means of a plurality of axially movable selector pins and free-running clutches arranged in the countershaft, wherein the countershaft is connected to a pinion as the output member of the bicycle transmission by means of a planetary transmission. The pinion is connected to the sun wheel of the planetary transmission by a clutch, and the annulus of the planetary transmission can be blocked or fixed by means of a Bowden cable. The planetary transmission thereby forms a two-speed transmission, which is connected in series with the seven-speed transmission on the countershaft, thus allowing fourteen gears to be formed by means of the bicycle transmission as a whole. The disadvantage with the system is the axially large form of construction and the relatively small number of fourteen gears that can be formed. It is furthermore disadvantageous that the two partial transmissions must be activated separately and therefore have to be operated with an increased effort. In this context, it is furthermore disadvantageous that the two partial transmissions are not matched to one another and hence that sequential shifting through all the gears and, in particular, simultaneous shifting of both partial transmissions is inconvenient.

DE 10 2008 064 514 A1 discloses another transmission unit for a vehicle driven by muscle force, having an input shaft, an output shaft and a countershaft, wherein a plurality of loose wheels is mounted on the countershaft which, with gearwheels on the input shaft or the output shaft, form wheel pairs of two partial transmissions, and wherein the loose wheels can be connected for conjoint rotation to the countershaft by means of selectable free-running clutches, wherein the free-running clutches can be actuated by means of two separate camshafts. In this case, control of the two camshafts by two separate planetary transmissions is associated with a corresponding space requirement and an additional outlay on control for synchronization of the two partial transmissions.

It is therefore the object of the present invention to provide an improved shifting device and an improved transmission unit for a vehicle driven by muscle force, which unit has a compact form of construction, has improved shifting convenience and can be implemented with low technical effort.

BRIEF SUMMARY OF THE INVENTION

According to a first aspect of the invention, this object is achieved by a shifting device for a transmission unit, in particular for a vehicle which is operated by muscle force, having a shaft, on which a plurality of loose wheels is mounted which form with a corresponding plurality of gearwheels wheel pairs of two partial transmissions, wherein the shaft is designed as a hollow shaft and the loose wheels can be connected to the shaft by means of selecting means, wherein the two partial transmissions are assigned in each case one camshaft which is mounted in the hollow shaft, and the selecting means can be actuated selectively by the camshafts, wherein the camshafts are connected to driving means in order to rotate the camshafts relative to the shaft in order to actuate the selecting means, wherein the camshafts are connected rotationally fixed to one another, and a rotation of the camshafts relative to the shaft brings about an axial movement of one of the camshafts.

According to a second aspect of the invention, this object is achieved by a shifting device for a transmission unit, in particular for a vehicle which is operated by muscle force, having a shaft, on which a plurality of loose wheels is mounted which form with a corresponding plurality of gearwheels wheel pairs, wherein the shaft is designed as a hollow shaft and the loose wheels can be connected to the shaft by means of selecting means, wherein the selecting means are assigned a camshaft mounted in the hollow shaft and the selecting means can be actuated selectively by the camshaft, wherein the camshaft is connected to driving means in order to rotate the camshaft relative to the shaft in order to actuate the selecting means, wherein the rotation of the camshaft relative to the shaft causes an axial movement of the camshaft, wherein the camshaft has at least one cam portion which is designed in such a way that the selecting means of different loose wheels can be actuated by the cam portion.

According to a third aspect of the invention, this object is achieved by a shifting device for a transmission unit, in particular for a vehicle which is operated by muscle force, having a shaft, on which a plurality of loose wheels is mounted which form with a corresponding plurality of gearwheels wheel pairs of two partial transmissions, wherein the shaft is designed as a hollow shaft and the loose wheels can be connected to the shaft by means of selecting means, wherein the two partial transmissions are assigned in each case one camshaft which is mounted in the hollow shaft, and the selecting means can be actuated selectively by the camshafts, wherein the camshafts are connected to driving means in order to rotate the camshafts relative to the shaft in order to actuate the selecting means, wherein a first of the camshafts is connected to the driving means through a second of the camshafts by means of a drive shaft.

According to a fourth aspect of the invention, the object is achieved by a shifting device for a transmission unit, in particular for a vehicle which is operated by muscle force, having a first partial transmission and a second partial transmission, which are connected in series for power transmission, wherein the first partial transmission has a shaft, which is designed as a hollow shaft and on which a plurality of loose wheels is mounted which form with a corresponding plurality of gearwheels wheel pairs of the first partial transmission, wherein the loose wheels can be connected to the shaft by means of selecting means in order to form different gear stages of the first partial transmission, wherein the selecting means can be actuated by a camshaft arranged in the shaft, wherein the selecting means of the first partial transmission are designed as selectable free-running clutches, and wherein the second partial transmission has a plurality of selectable gear stages, wherein the camshaft is designed in such a way that, when shifting from a highest stage of the gear stages of the first partial transmission to a lowest stage of the gear stages of the first partial transmission, the free-running clutches of the two gear stages are actuated at least temporarily simultaneously, and a load change between the corresponding free-running clutches allows a shifting operation of the second partial transmission to a higher stage of the gear stages.

According to a fifth aspect of the invention, the object is achieved by a shifting device for a transmission unit, in particular for a vehicle which is operated by muscle force, having a first partial transmission and a second partial transmission, which are connected in series for power transmission, wherein the second partial transmission has a shaft, which is formed as a hollow shaft and on which a plurality of loose wheels is mounted which form with a corresponding plurality of gearwheels wheel pairs of the second partial transmission, wherein the loose wheels can be connected to the shaft by means of selecting means in order to form different gear stages of the second partial transmission, wherein the selecting means can be actuated by means of a camshaft arranged in the shaft, wherein the selecting means of the second partial transmission are designed as selectable free-running clutches, wherein the first partial transmission has a plurality of selectable gear stages, wherein the camshaft is designed in such a way that, when shifting from a higher stage of the gear stages of the second partial transmission to a lower stage of the gear stages of the second partial transmission, the free-running clutches of the two gear stages are actuated at least temporarily simultaneously, and a load change between the corresponding free-running clutches allows a shifting operation of the first partial transmission from a lowest stage of the gear stages of the first partial transmission to a highest stage of the gear stages of the first partial transmission.

According to a sixth aspect of the invention, the abovementioned object is achieved by a shifting device for a transmission unit, in particular for a vehicle which is operated by muscle force, having a shaft, which is formed as a hollow shaft and on which a plurality of loose wheels is mounted which form with a corresponding plurality of gearwheels wheel pairs of different gear stages, wherein the loose wheels can be connected to the shaft by means of selectable free-running clutches, wherein the free-running clutches can be actuated selectively by a camshaft rotatably mounted in the hollow shaft, wherein the camshaft can be rotated in both directions of rotation relative to the shaft by means of driving means in order to actuate the free-running clutches and move them out of engagement with the loose wheels, wherein the free-running clutches have selector pawls mounted rotatably or swivelably on the shaft, and wherein the driving means are designed to rotate the camshaft for a change from a higher gear stage to a lower gear stage in a direction of rotation opposite to the direction of rotation of the selector pawls during disengagement.

According to a seventh aspect of the invention, the above object is achieved by a transmission unit, in particular for a vehicle driven by muscle force, having a continuous shaft, which forms an input shaft of the transmission unit and can be connected at its ends to cranks, an output shaft, which is arranged coaxially with the input shaft, and a countershaft, which has a shifting device of the type described above.

According to an eighth aspect of the invention, the object is achieved by a method for shifting a transmission unit, wherein the gear stages of the transmission unit are engaged and/or changed by means of a shifting device according to the invention.

One advantage of the first aspect of the invention is that the camshafts are interlinked and in that the two partial transmissions can be shifted in a manner dependent one upon the other by the joint rotation of the camshafts, and hence the shifting effort for shifting the two partial transmissions is reduced and the ease of shifting is simultaneously improved. In other words, the shifting device can shift both partial transmissions simply through the joint rotation of the camshafts, thus eliminating separate shifting of the two partial transmissions.

One advantage of the second aspect of the invention is that the cams on the camshaft actuate several of the selecting means and, as a result, there is an increase in the useful axial range of movement, thereby making it possible to achieve a more compact form of construction in the axial direction.

One advantage of the third aspect of the invention is that the two camshafts are rotated or controlled from one axial end, thereby making possible a more compact form of construction in the axial direction and thereby reducing the technical effort involved in controlling the camshafts. In other words, the camshafts do not have to be controlled from two opposite sides but can be rotated or controlled by driving means from one axial end, thereby reducing the outlay for supporting the corresponding shaft.

One advantage of the fourth aspect of the invention is that the two partial transmissions are synchronized and, during a shifting operation in both partial transmissions, i.e. when the first of the partial transmissions is shifted from a highest gear stage to a lowest gear stage and the second partial transmission is simultaneously shifted from a low gear stage to a higher gear stage, precise simultaneous shifting is possible since the second partial transmission is shifted only at the time of the actual load change of the first partial transmission. In other words, it is thereby possible to prevent one of the two partial transmissions from being shifted before the other of the partial transmissions and, as a result, the overall transmission briefly being shifted into a very low gear or a very high gear. Overall, downshifting of the first partial transmission and simultaneous upshifting of the second partial transmission is thereby possible.

One advantage of the fifth aspect of the invention is that the two partial transmissions are synchronized and, during a shifting operation in both partial transmissions, i.e. when the second partial transmission is shifted from a higher gear stage to a low gear stage and the first partial transmission is simultaneously shifted from a lowest gear stage to a highest gear stage, precise simultaneous shifting is possible, thereby making shifting of the transmission unit easier overall.

One advantage of the sixth aspect of the invention is that downshifting under load or under partial load is possible since the corresponding selector pawl can be moved out of engagement with the corresponding loose wheel with a greater force. In the case of downshifting by means of selectable freerunning clutches, it is generally necessary greatly to reduce the driving force or briefly to interrupt it completely to ensure that the load on the corresponding selector pawl falls to zero and that it can be retracted by means of a low force before the corresponding selector pawl of the lower gear can be brought into engagement with the loose wheels. Since, according to the fourth aspect of the invention, a significantly higher force must be exerted on the selector pawls in order to retract the selector pawl, the driving force does not have to be interrupted. As a result, it is possible overall to obtain a power shift transmission which can be both upshifted under load and downshifted under load.

In the first aspect of the invention, it is preferred if the camshafts are connected rotationally fixed to one another and axiallly movable by means of a connecting shaft.

As a result, the two camshafts can be connected to one another for conjoint rotation and axial movement by simple means at low cost.

It is furthermore preferred if the axially movable second camshaft has an at least partially circumferential groove having a transverse portion, in which a pin engages, which is connected to the shaft, wherein the transverse portion causes the axial movement at a predefined rotational position of the camshaft.

It is thereby possible reliably to cause the axial movement with low friction at certain rotational positions by technically simple means.

It is furthermore preferred if the axially movable camshaft has at least one cam portion, having an actuating portion for actuating the selecting means by rotation of the camshaft, and an at least partially circumferential sliding portion for maintaining the shift state of the selecting means over a predefined angle of rotation.

It is thereby possible, at a particular rotation, for the selecting means to be actuated by the rotation of the camshaft and to maintain the shift state over a predefined angle of rotation, thereby making it possible to link the shift sequences of the first and second partial transmissions in a logical manner. In other words, it is thereby possible for a shift state in the second partial transmission to be selected and maintained over a number of shifting operations of the first partial transmission.

In this case, it is preferred if the actuating portion and the sliding portion adjoin one another in the direction of rotation.

It is thereby possible for the selected shift states to be maintained over a predefined angle of rotation of the camshafts by technically simple means.

It is preferred here if the selecting means, the cam portion and the obliquely transverse portion are arranged in such a way that the selecting means of different gear stages can be actuated by the cam portion.

It is thereby possible to increase the useful axial range of movement without having to increase the spacing between the selecting means, thereby making it possible overall to achieve a more compact form of construction in the axial direction.

It is furthermore preferred if the sliding portion is designed to completely encircle the camshaft in order to maintain a corresponding shift state over a complete revolution of the camshaft.

It is thereby possible to maintain a shift state of the second partial transmission over a complete shifting sequence of all the gear stages of the first partial transmission, thereby making it possible by simple means to shift through all the gears of the transmission unit.

In the third aspect of the invention, it is preferred if the driving means of both camshafts are arranged at one axial end of the shaft.

It is thereby possible to achieve a form of construction of the shifting device or of the corresponding transmission unit which is compact overall in the radial direction as well.

It is particularly preferred if the driving means have a speed superimposition transmission.

It is thereby possible to achieve a relative rotation between the camshaft and the shaft by technically simple means.

It is particularly preferred here if the driving means have two, in particular three or more, planetary transmissions, which are connected to one another.

It is thereby possible to achieve a compact and technically simple speed superimposition transmission in order to rotate one and, in particular, two camshafts relative to the shaft.

It is preferred here if planet carriers of the planetary transmissions are connected to one another.

It is thereby possible to transmit a speed of rotation to the camshafts via the annuluses of the planetary transmissions with little technical effort.

It is preferred here if the driving means have a transmission stage to transmit the rotation of the shaft to the camshafts, and wherein the driving means have two control stages to separately transmit a relative rotation to the respective camshafts.

It is thereby possible for both camshafts to be rotated synchronously with the shaft by a common transmission stage and for a relative rotation to be transmitted to the camshafts independently of one another, thereby making it possible to implement the driving means in a more compact manner overall and thereby requiring less installation space.

In the fourth and fifth aspect of the invention, it is preferred if the load change allows a movement of the camshaft which initiates the shifting operation in the other of the partial transmissions in each case.

It is thereby possible for a shifting operation of the other partial transmission in each case to be mechanically initiated by technically simple means.

It is preferred here if, in an intermediate state, in which the free-running clutches of the two gear stages of the first partial transmission or of the second partial transmission are actuated simultaneously, the camshaft is preloaded against the corresponding free-running clutch and is released during the load change.

It is thereby possible, by simple means, reliably to determine the actual time of the load change and to transmit it to the second partial transmission. It is thereby possible to achieve simultaneous shifting of both partial transmissions, thereby making it possible to avoid briefly shifting the shifting device to a very much lower gear or to a very much higher gear.

It is preferred here if the second partial transmission is formed by a plurality of loose wheels, which are mounted on the shaft and form with a corresponding plurality of gearwheels wheel pairs of the second partial transmission, wherein the second partial transmission has a camshaft which can be rotated and/or moved axially in the shaft and is designed to perform a gear change in the second partial transmission during the load change and, in particular, to simultaneously actuate free-running clutches of two successive gear stages.

It is thereby possible to achieve a compact form of construction of the shifting device since it is possible to dispense with complex means for linking the shifting operations in the two partial transmissions.

It is preferred here if the free-running clutches have swivelable pawls, which block the rotation of the camshaft in the intermediate state before the load change.

It is thereby possible to implement the shifting device in a compact form of construction and to detect the load change with little technical effort and to transmit it to the second partial transmission.

In the case of all the aspects of the present invention, it is preferred overall if the driving means are designed to rotate the camshaft or camshafts synchronously with the shaft in order to maintain a shift state and to rotate at least one of the camshafts relative to the shaft in order to change a shift state.

It is thereby possible to achieve a simple and compact shifting device.

In the case of all the aspects of the invention, it is furthermore preferred if two successive gear stages can be actuated simultaneously in each case.

It is thereby possible to obtain a power shift transmission, thereby simultaneously preventing neutral pedaling.

It is obvious that the features mentioned above and those which remain to be explained below can be used not only in the respectively indicated combination but also in other combinations or in isolation without exceeding the scope of the present invention.

BRIEF DESCRIPTION OF THE SEVERAL VIEWS OF THE DRAWING

Illustrative embodiments of the invention are shown in the drawing and are explained in greater detail in the following description. In the drawing:

FIG. 6 shows a perspective assembly drawing of the camshafts in FIG. 5;

FIGS. 10a to d show a shift sequence intended to elucidate the synchronization of the two partial transmissions;

FIGS. 12a to f show two loose wheels of successive gear stages in an axial direction of view intended to elucidate shifting under load.

DETAILED DESCRIPTION OF THE ILLUSTRATED EMBODIMENTS

Figure 1:
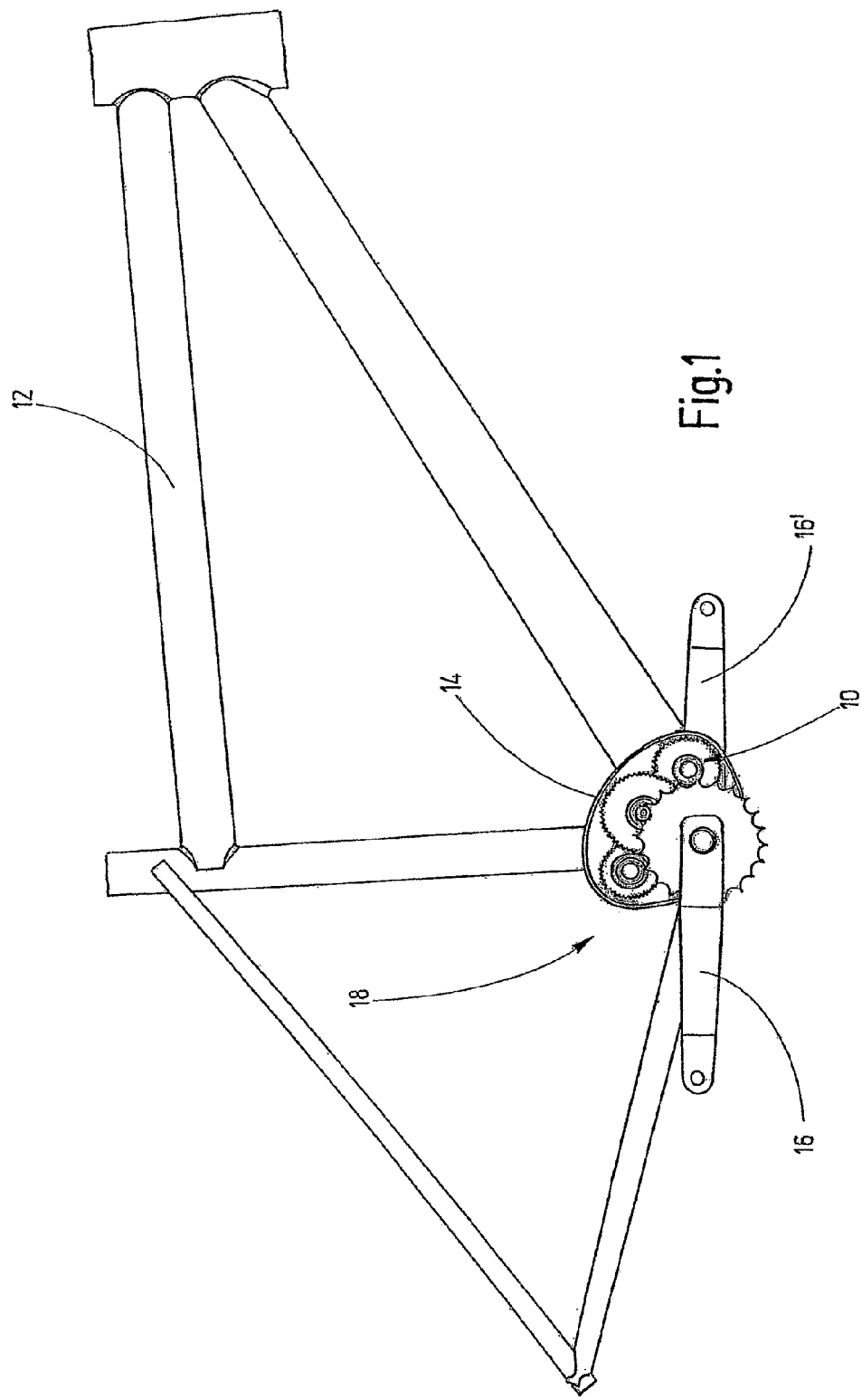
FIG. 1 shows a side view of a bicycle frame with a multispeed transmission.

In FIG. 1, a transmission unit is designated in general by 10.

FIG. 1 shows a side view of a bicycle frame 12, which has a transmission housing 14, in which the transmission unit 10 is accommodated. In this illustration, the transmission unit 10 is indicated only schematically and is designed as a compact unit, which is preferably arranged in a transmission cage (not shown here). In this context, the transmission unit 10 is described by way of example for use on a two wheeler, wherein the use on other muscle-powered vehicles is also possible. It is obvious that the transmission unit 10 can also be used for vehicles on which muscle force is used in combination with a driving machine to drive the vehicle.

The transmission unit 10 and the transmission housing 14, together with pedal cranks 16 and 16', form a multispeed transmission 18.

Figure 2:
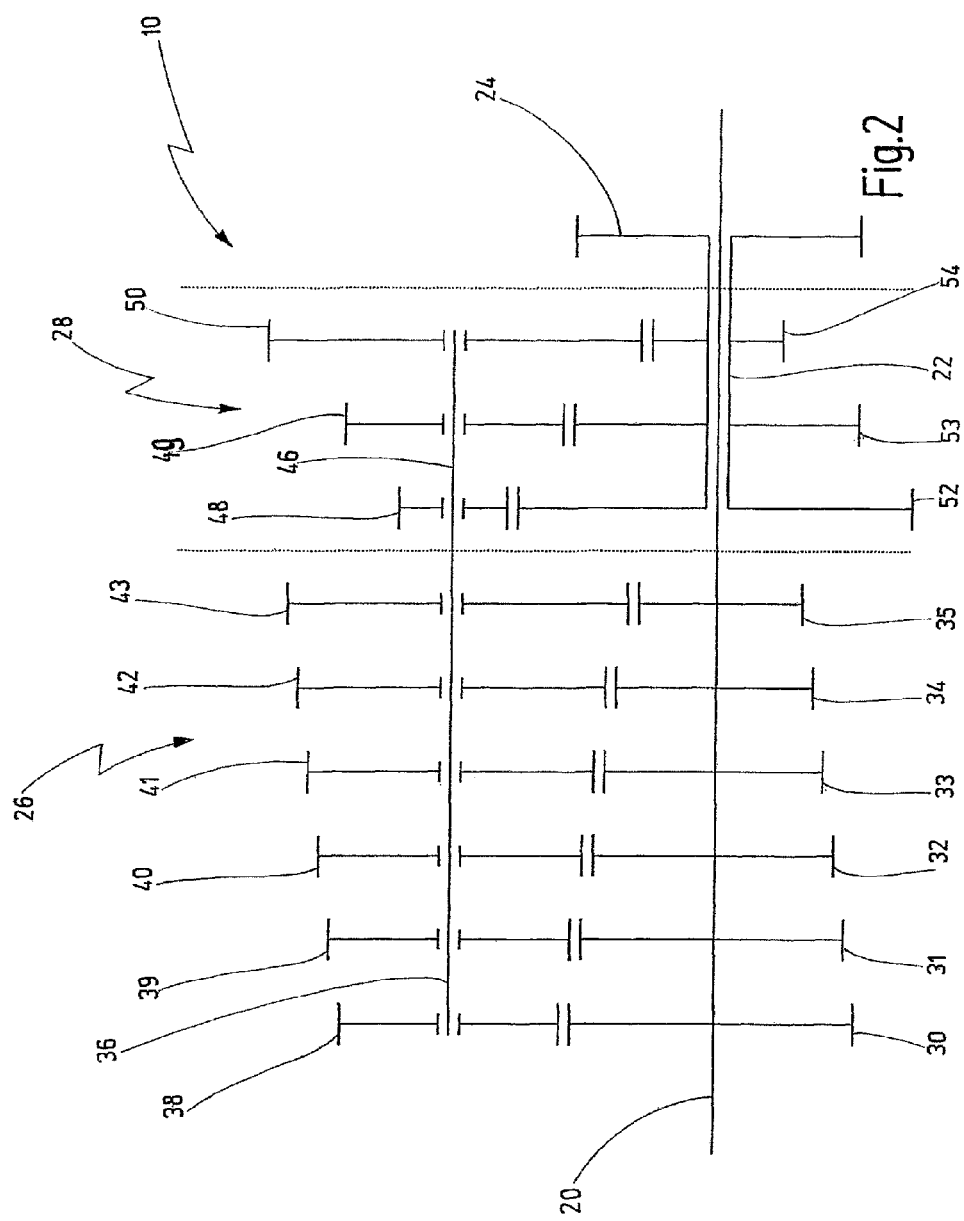
FIG. 2 shows a shift diagram of a multispeed transmission having two partial transmissions and a common countershaft.

FIG. 2 shows a shift diagram for the transmission unit 10.

The transmission unit 10 has an input shaft 20 and an output shaft 22. The input shaft 20 is designed as a continuous shaft. The output shaft 22 is designed as a hollow shaft. The input shaft 20 and the output shaft 22 are arranged coaxially with one another. The output shaft 22 is connected rotationally fixed to a chain wheel 24, which forms an output member of the transmission unit 10.

The transmission unit 10 has a first partial transmission 26 and a second partial transmission 28. A plurality of driving wheels 30, 31, 32, 33, 34, 35 is mounted on the input shaft 20. The first partial transmission 26 has a countershaft 36. Driven wheels 38, 39, 40, 41, 42, 43 are mounted on the countershaft 36. The driven wheels 38 to 43 are designed as loose wheels.

The driven wheels 38 to 43 can be connected to the countershaft 36 by means of selecting means (not shown). The driven wheels 38 to 43 and the driving wheels 30 to 35 form wheel pairs which have different transmission ratios, making it possible to obtain different gear stages through selective connection of the driven wheels 38 to 43 to the countershaft 36.

The second partial transmission 28 has an input shaft 46. Driving wheels 48, 49, 50 are mounted on the input shaft 46. The driving wheels 48 to 50 are designed as loose wheels. The driving wheels 48 to 50 can be connected rotationally fixed to the input shaft 46 by means of selecting means. The driven wheels 52, 53, 54 are mounted on the output shaft 22. The driven wheels 52 to 54 mesh with the driving wheels 48 to 50.

The intermeshing driven wheels 52 to 54 and driving wheels 48 to 50 form wheel pairs which have different transmission ratios. The driving wheels 48 to 50 can be connected rotationally fixed to the input shaft 46 by means of selecting means (not shown), thereby forming different selectable gear stages of the second partial transmission 28.

The countershaft 36 of the first partial transmission 26 is connected rotationally fixed to the input shaft of the second partial transmission 28. The countershaft 36 is preferably formed integrally in one piece with the input shaft 46.

The driving wheels 30 to 35 are each preferably connected nonpositively by means of a clutch (not shown) and, in particular, frictionally by means of a friction clutch to the input shaft 20. The clutch is designed to limit a torque introduced into the transmission unit 10. The clutch is designed so that the connection between the input shaft 20 and the corresponding driving wheel 30 to 35 slips if a predefined or adjustable torque is exceeded. By means of a torque limitation feature of this kind, it is possible to reduce the overall size and the weight of the transmission unit since the transmission unit can be designed for a lower maximum torque.

By virtue of the fact that the first partial transmission 26 is connected to the second partial transmission 28, the possible achievable gear stages of the first partial transmission 26 can be multiplied by the gear stages of the second partial transmission 28. Thus, eighteen gears can be obtained by means of the transmission unit 10 illustrated in FIG. 2.

It is furthermore conceivable that there should be the possibility of connecting the input shaft 20 rotationally fixed to the output shaft 22 by means of a clutch (not shown). It would thereby be possible to obtain a further gear as a direct gear.

Figure 3:
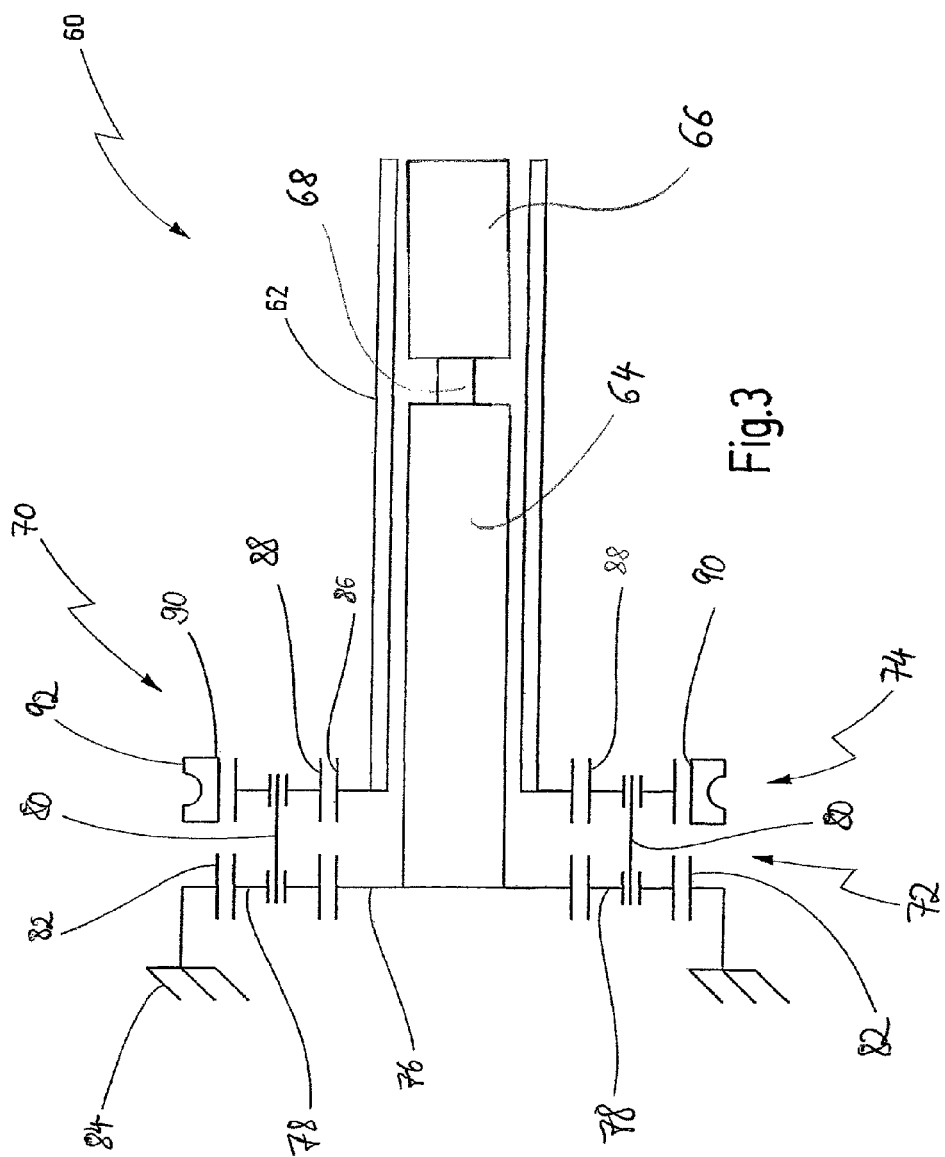
FIG. 3 shows a schematic shift diagram for a shifting device having a rotatable camshaft and an axially movable camshaft.

FIG. 3 shows schematically a shift diagram for a shifting device having an axially movable camshaft. In FIG. 3, the shifting device is designated in general by 60. In general terms, the shifting device 60 is used to selectively connect loose wheels (not shown) of two different partial transmissions, said loose wheels being mounted on a shaft 62, rotationally fixed to the shaft 62 by means of selecting means (not shown). The shifting device 60 has a first camshaft 64, which is arranged coaxially in the shaft 62 and is mounted so as to be rotatable relative to the latter. The shifting device 60 furthermore has a second camshaft 66, which is arranged coaxially in the shaft 62 and is mounted so as to be rotatable and axially movable relative to the latter. The first camshaft 64 and the second camshaft 66 are connected rotationally fixed to one another and axially movable by means of a connecting shaft 68.

A speed superimposition transmission 70, which is connected both to the shaft 62 and to camshaft 64, is arranged at one axial end of the shaft 62. The speed superimposition transmission 70 is arranged coaxially to the shaft 62. The speed superimposition transmission 70 is formed by a transmission stage 72 and a control stage 74. The control stage 74 is connected to the shaft 62 and the transmission stage 72 is connected to camshaft 64. As an alternative, it is also possible for the control stage 74 to be connected to camshaft 64 and the transmission stage 72 to be connected to the shaft 62. The transmission stage 72 is formed by a first planetary transmission 72. The control stage 74 is formed by a second planetary transmission 74. The first planetary transmission 72 has a sun wheel 76, which is connected rotationally fixed to camshaft 64. The planetary transmission 72 has planet gears 78, which are mounted on a planet carrier 80. The planet wheels 78 mesh with the sun wheel 76. The first planetary transmission 72 has an annulus 82, with which the planet wheels 78 mesh. The annulus 82 is fixed to a fixed reference point 84, preferably a transmission cage or transmission housing (not shown), and connected rotationally fixed thereto.

The second planetary transmission 74 has a sun wheel 86, which is connected rotationally fixed to the shaft 62. The second planetary transmission 74 has planet wheels 88, which are mounted on the planet carrier 80. The planet wheels 84 mesh with the sun wheel 86. The second planetary transmission 74 has an annulus 90, with which the planet wheels 88 mesh. The annulus 90 is connected rotationally fixed to a pulley 92, on which a Bowden cable (not shown) can be secured.

The first planetary transmission 72 and the second planetary transmission 74 are dimensioned in such a way that, when the annulus 90 is stationary or fixed, the transmission ratio from the shaft 62 to camshaft 64 is precisely 1, with the result that the shaft 62 and camshaft 64 rotate synchronously in this case. The second planetary transmission 74 or the control stage 74 serves to superimpose an additional speed of rotation on the speed of rotation of the shaft 62. This additional speed of rotation is transmitted via the annulus 90 to the planet carrier 80. By virtue of the fact that the planet wheels 88 of the second planetary transmission 74 and the planet wheels 78 of the first planetary transmission 72 are connected to one another by the planet carrier 80, a total speed of rotation, being the sum of the speed of rotation of the shaft 62 and of the rotation of the annulus 90, is transmitted to the first planetary transmission 72. The first planetary transmission 72 or the transmitter stage 72 serves to transmit the total speed of rotation to camshaft 64. The annulus 90 is connected rotationally fixed to the pulley 92 to enable it to be actuated by means of a Bowden cable (not shown). In this case, the pulley 92 is rotated through a certain angle of rotation in the direction of rotation of the shaft 62 or counter to the rotation of the shaft 62 in order to transmit this rotary motion to camshaft 64. As a result, the gears of the transmission unit 10 can be selected by actuating the Bowden cable. The sun wheel 86 is preferably designed as part of the shaft 62 or is integral with the shaft 62.

Camshaft 66 is connected rotationally fixed and axial movement to camshaft 64 by means of the connecting shaft 68. Camshaft 66 is connected in such a way to the shaft 62, via a control pin or the like, that a rotation of camshaft 66 relative to the shaft 62 causes axial movement of camshaft 66.

As a result, camshafts 64 and 66 can selectively actuate selecting means of loose wheels of different partial transmissions, wherein particular shifting sequences of the two partial transmissions can be achieved through the predefined axial movement of camshaft 66.

Figure 4:
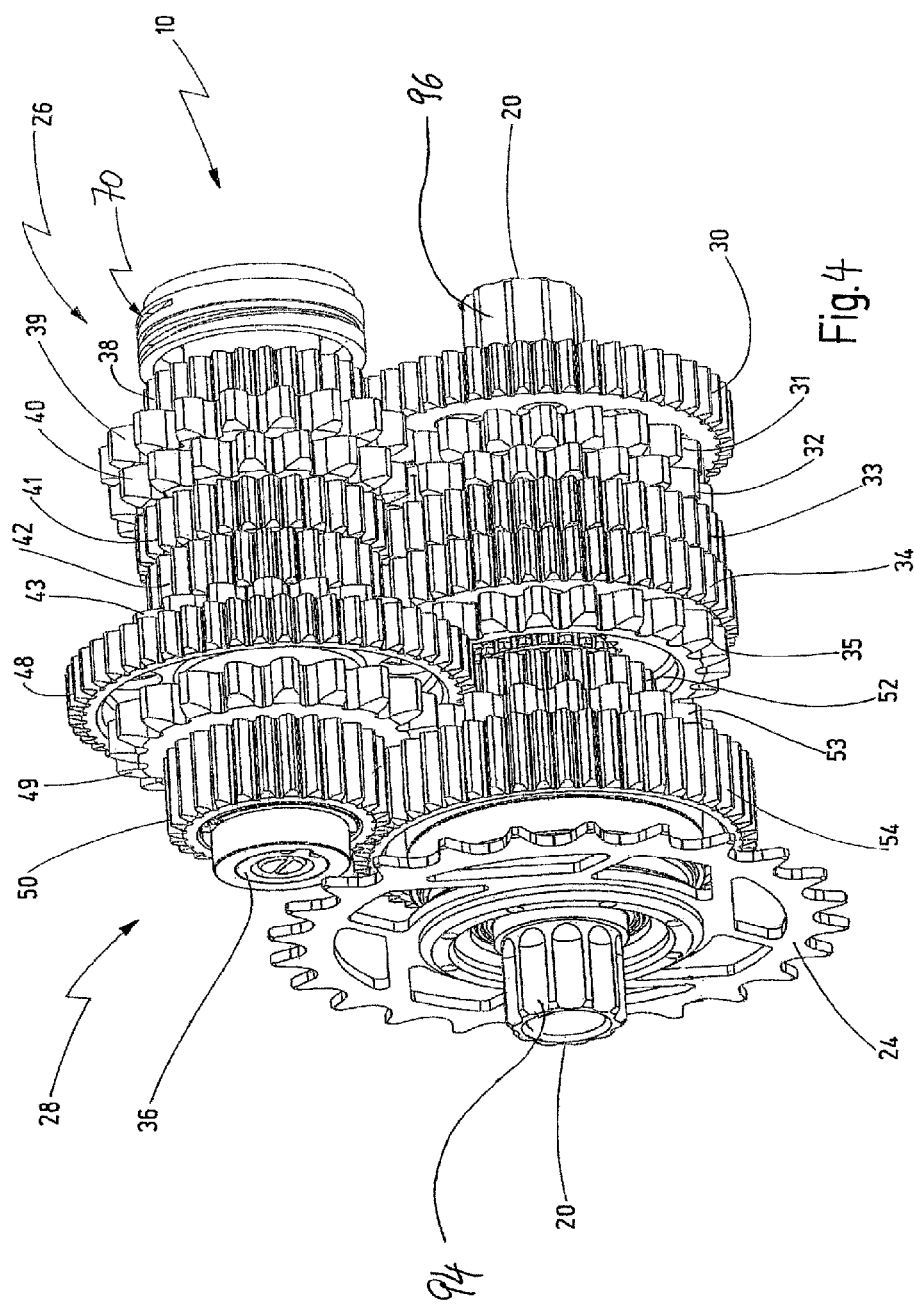
FIG. 4 shows a perspective view of an embodiment of a transmission unit having two partial transmissions and a common countershaft.

A perspective illustration of the transmission unit 10 is shown in FIG. 4. The transmission unit 10 corresponds to the shift diagram shown in FIG. 2, wherein identical elements are designated by the same reference numerals and only the differences are explained here.

The input shaft 20 has connecting portions 94, 96 at the axial ends thereof in order to connect pedal cranks (not shown) rotationally fixed to the input shaft 20. The chain wheel 24 is mounted on one axial end of the output shaft 22 (not shown). The chain wheel 24 is connected to a connecting element (not shown) by means of a central screw 94 and is thereby connected rotationally fixed to the output shaft 22.

The countershaft 36 is arranged parallel to the input shaft 20. The loose wheels 38 to 43 and 48 to 50 are mounted on the countershaft 36, which is formed integrally with the input shaft 46 of the second partial transmission 28. The speed superimposition transmission 70 is mounted on one axial end of the countershaft 36. The loose wheels 38 to 43 and 48 to 50 can be connected to the countershaft 36 or selected by means of camshaft 64 (not shown) in conjunction with the selecting means (not shown), wherein camshaft 64 can be rotated relative to the countershaft 36 by means of the speed superimposition transmission 70.

Figure 5:
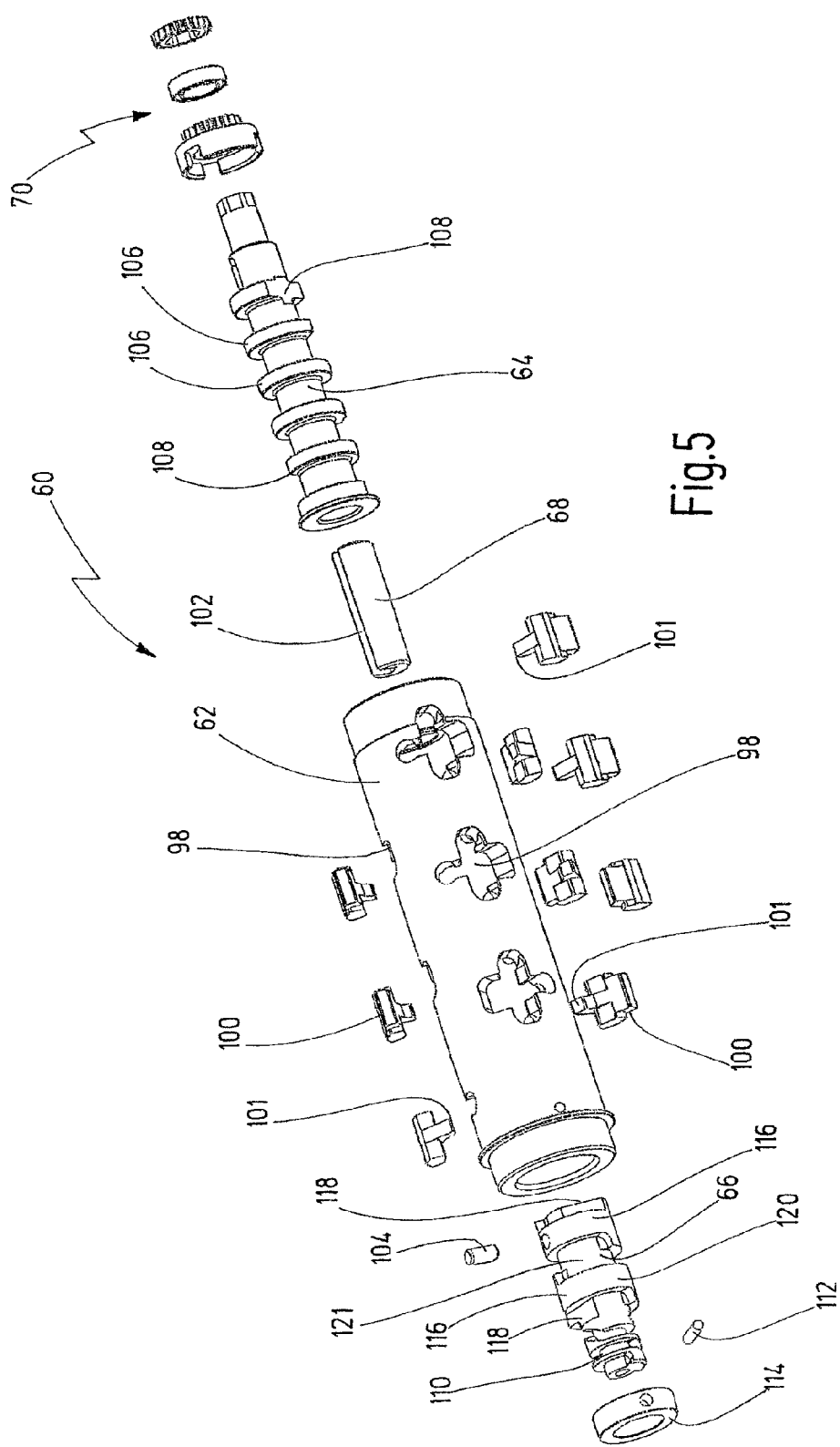
FIG. 5 shows a perspective exploded view of a shifting device having a rotatable camshaft and an axially movable camshaft.

A perspective exploded view of the selected device 60 is illustrated in FIG. 5. Identical elements are provided with the same reference numerals, and only the differences are explained here.

The shaft 62 has a plurality of recesses 98, in which selector pawls 100 are mounted. The selector pawls 100 each have an actuating portion 101 or actuating tab 101. The selector pawls 100 are mounted swivelably or rotatably in the recesses 98 in order to engage in internal toothing of loose wheels (not shown) and to connect the loose wheels rotationally fixed to the shaft 62. The selector pawls 100 are mounted on the shaft 62 in such a way that the actuating portions 101 are arranged in the respective recesses 98 in a retracted state of the selector pawls 100 and project into the shaft 62 in an extended state. The camshafts 64, 66 are mounted rotatably and coaxially in the shaft 62. The first camshaft 64 and the second camshaft 66 are connected to one another for axial movement and conjoint rotation by the connecting shaft 68. For this purpose, the connecting shaft 68 has a longitudinal groove 102, in which a pin 104 of the second camshaft 66 engages. The first camshaft 64 is connected to the shaft 62 by means of the speed superimposition transmission 70 in order to achieve a rotation relative to the shaft 62. The first camshaft 64 has a plurality of cams 106, which each have an actuating portion 108. The cams 106 and actuating portions 108 serve to selectively actuate the actuating portions 101 of the selector pawls 100 in different rotational positions of camshaft 64 and thereby to obtain different gear stages of the first partial transmission 26.

The selector pawls 100 are designed in such a way that they swivel outward and connect a corresponding loose wheel of the loose wheels rotationally fixed to the shaft 62 when no pressure is being exerted by the respective camshaft 64, 66 on the respective actuating portion 101 of the selector pawls 100. For this purpose, the selector pawls 100 are appropriately spring-loaded. In other words, a selector pawl 100 is retracted if a sliding portion 106, 116 of the camshafts 64, 66 is arranged underneath the selector pawl 100 and is extended if an actuating portion 108, 118 is arranged underneath the selector pawl 100.

The second camshaft 66 has a circumferential groove 110, in which a pin 112 engages. The pin 112 is connected rotationally fixed to the shaft 62 by means of a bearing ring 114. The circumferential groove 110 in the second camshaft 66 is designed in such a way that rotation of the second camshaft 66 relative to the shaft 62 brings about an axial movement of camshaft 66, as explained in greater detail below.

The second camshaft 66 has two cams 116, which each have two actuating portions 118 and one sliding portion 120. The actuating portions 118 serve to actuate the selector pawls 100 of the second partial transmission 28. The sliding portions 120 serve to maintain the shift state of the selector pawls 100 over a predefined angle of rotation of the shaft 66, i.e. to hold the selector pawls 100 in a retracted state.

The sliding portion 116 of the second camshaft 66 is designed to be fully encircling, and therefore the corresponding selector pawl 100 remains retracted over a complete revolution of the camshafts 64, 66. Fully encircling portions 121 are formed between the cams 116, allowing the respective selector pawl 100 to extend over a complete revolution of the camshafts 64, 66 and thereby obtaining a corresponding gear stage of the second partial transmission 28. The actuating portions 118 are arranged on the cams 116 in such a way that they in each case form a connecting ramp between the encircling portions 121 and the sliding portion 120 in the direction of rotation of camshaft 66. The actuating portions 118 of a cam 116 are each preferably arranged offset relative to one another in the circumferential direction and in the axial direction.

An assembly drawing of the shifting device 60 without the shaft 62 is shown in perspective in FIG. 6. Identical elements are designated by the same reference numerals, and only the special features are explained here.

The selector pawls 100 of the first partial transmission 26 are associated in a fixed manner with the cams 106 of the first camshaft 64. The second camshaft 66 is arranged in such a way in an axial position relative to the selector pawls 100 of the second partial transmission 28 that one of the selector pawls 100 shown here is retracted due to the sliding portion 120. The second cam 116 is arranged axially adjacent to the second selector pawl 100 depicted here, with the result that this selector pawl is actuated, i.e. extended, and connects the corresponding loose wheel of the loose wheels rotationally fixed to the shaft 62. A further selector pawl 100 is arranged axially between the first and second selector pawls 100, this further selector pawl being concealed by camshaft 66 in this illustration and being assigned to a second gear stage.

The axially movable second camshaft 66 is shown in different axial positions in FIGS. 7a to d to illustrate the operation. Identical elements are designated by the same reference numerals, and only the differences and special features are explained here.

The pin 112 engages in the groove 110, which has an oblique portion 122. Owing to the engagement of the pin 112 in the groove 110, the oblique portion 122 brings about the axial movement of camshaft 66 when camshaft 66 rotates. In the axial position of camshaft 66 illustrated in FIG. 7a, the actuating portion 101 of the selector pawl 100 shown is extended inward, with the result that the selector pawl 100 is in engagement with internal toothing of the corresponding loose wheel (not shown).

Figure 7A:
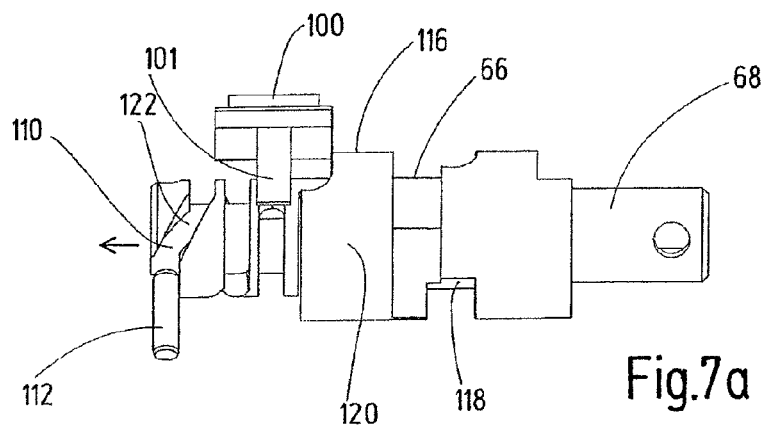
FIGS. 7a to d show different axial and rotational positions of the axially movable camshaft for actuating a selector pawl.
Figure 7B:
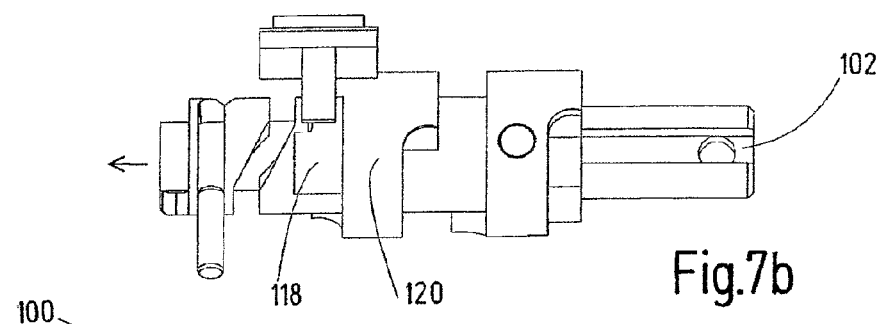

In FIG. 7b, the second camshaft 66 has been twisted or rotated relative to the illustration in FIG. 7a and has been moved in the axial direction relative to the illustration in FIG. 7a by the pin 112 engaging in the groove 110 and by the oblique portion 122. By means of such an axial movement and rotation of the second camshaft 66, the actuating portion 118 or ramp 118 is rotated or moved under the actuating portion 101, as a result of which the selector pawl 100 is retracted accordingly and moved out of engagement with the internal toothing of the associated free pinion.

Figure 7C:
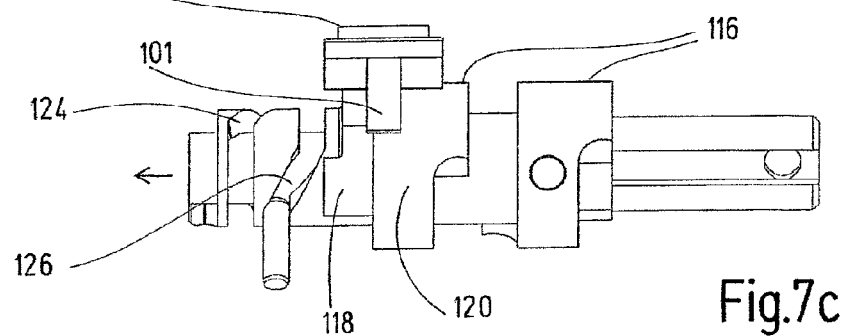
Figure 7D:
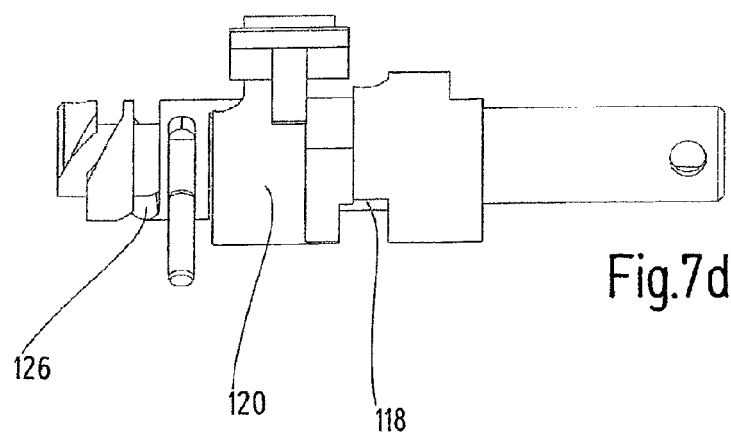

A further rotational position of the second camshaft 66 is illustrated in FIG. 7c. In this illustration, the second camshaft 66 is twisted through about 360° relative to the illustration in FIG. 7c. The second camshaft 66 has been moved into another axial position by another obliquely extending portion 124 of the groove 110. This has the effect that the actuating portion 101 is not passed over the ramp 118 again during a rotation through 360°. By means of the axial movement of the second camshaft 66, the actuating portion 101 is guided over the sliding portion 120 of the cam 116, with the result that the selector pawl 110 remains retracted over a complete revolution of the second camshaft 66.

Another rotational position of the second camshaft 66 is illustrated in 7d. In this rotational position, the second camshaft 66 has been moved further axially relative to the position in FIG. 7c by another oblique portion 126 of the groove 110. In this position of the second camshaft 66, the selector pawl 110 remains retracted, with the result that the corresponding loose wheel slides on the shaft 66.

By means of camshaft 66 which can be moved axially in this way, the selector pawls 100 can be actuated or extended selectively and moved out of engagement or retracted in a corresponding manner, and it is possible for the corresponding shift state to be maintained over any desired angle of rotation of the second camshaft 66.

The oblique portions 122, 124, 126 are arranged in such a way on the circumference of camshaft 66 that an axial movement takes place if the selector pawls 100 maintain their shift state. As a result, the frictional forces during shifting can be reduced and an axial movement of camshaft 66 can take place unhindered.

The selector pawl 100 illustrated in FIGS. 7a to d is correspondingly assigned to one gear stage of the second partial transmission 28 and is actuated or extended by means of a first complete rotation of 360° of the second camshaft 66 and retracted or moved out of engagement with the loose wheels by means of the following two revolutions of the second camshaft 66. It is thereby possible to shift through the gear stages of the first partial transmission 26 by means of one complete revolution of the first camshaft 64, with the respective gear stage of the second partial transmission 28 being changed only after one complete revolution. It is thereby possible to shift through all (in this case eighteen) gears of the transmission unit 10 in a sequence by rotating the two camshafts 100.

Figure 8A:
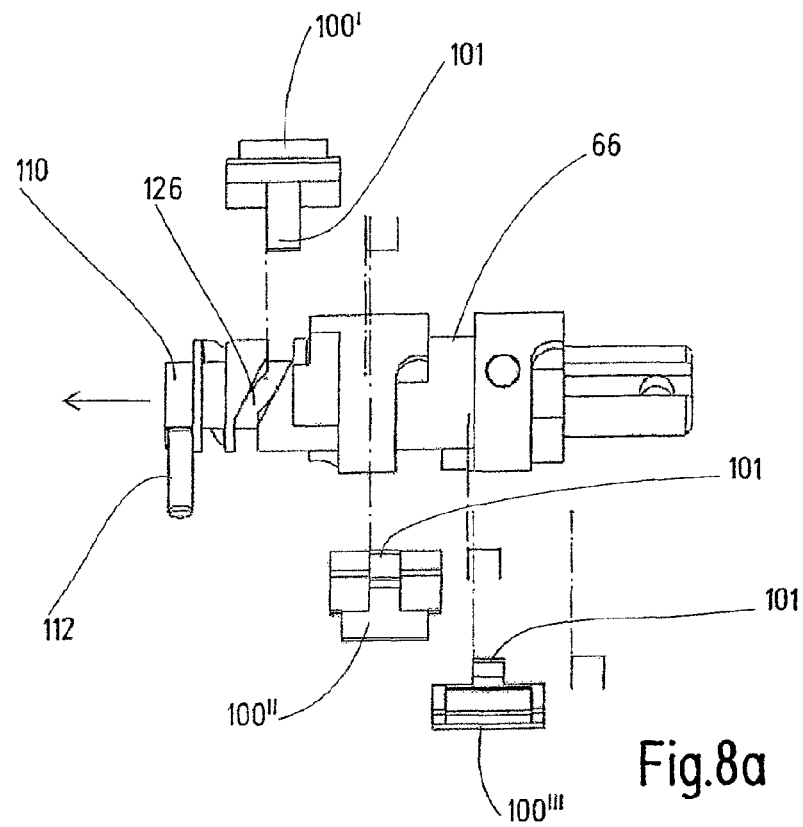
FIGS. 8a and b show the axially movable camshaft in two axial extreme positions.

Two extreme positions of the second camshaft 66 together with the three associated selector pawls 100 are illustrated schematically in FIGS. 8a and b. Identical elements are designated by the same reference numerals, and only the special features are explained here.

FIG. 8a illustrates an initial position of the second camshaft 66, which corresponds approximately to the first gear of the transmission unit 10. In this position, the pin 112 engages in an axially outermost portion of the groove 110. The three selector pawls 100 are illustrated schematically according to their positions in the respective recesses 98 in the shaft 62. In FIG. 8a, the three selector pawls are designated 100', 100" and 100''' in accordance with their association with the gear stages of the second partial transmission 28. The selector pawls 100 are positioned according to their position in the respective recesses 98 in the shaft 62. In the axial position in FIG. 8a, the cams 116 are arranged at the axial positions of selector pawls 100", 100''', with the result that the selector pawls 100", 100''' are retracted or moved out of engagement with respective loose wheels by the corresponding sliding portions 120. In this position of the second camshaft 66, selector pawl 100' is actuated or extended and accordingly connects the shaft 62 to the corresponding loose wheel. In this position of the second camshaft 66, the first gear stage of the second partial transmission 28 is thus engaged.

Figure 8B:
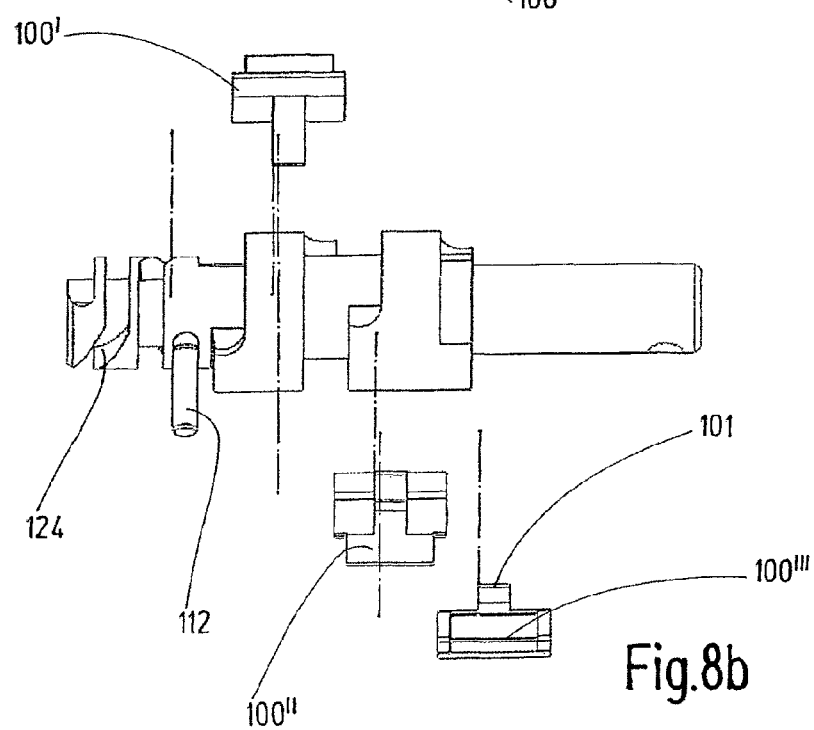

Another extreme position of the second camshaft 66, corresponding approximately to the 18th gear of the transmission unit 10, is illustrated in FIG. 8b. The pin engages in an axially inner portion of the groove 110, as a result of which the second camshaft 66 is arranged in an extreme left-hand position. In this position, selector pawls 100' and 100" are retracted by the sliding portions 120, whereas selector pawl 100''' is extended. In this position of the second camshaft 66, a third gear stage of the second partial transmission 28 is engaged.

Accordingly, at least one of the cams 116 is associated with selector pawls 100", 100''' of different loose wheels of the loose wheels 48-50, depending on the axial position of camshaft 66, in order to actuate said selector pawls in a corresponding manner or move them out of engagement with the loose wheels.

The axially movable second camshaft 66 makes it possible, by rotating the first camshaft 64, to shift through all the gear stages of the first partial transmission 26 and, after one complete revolution of the camshafts 64, 66, to bring about shifting of the second partial transmission.

In an alternative embodiment according to the invention, camshaft 66 is mounted as a single camshaft in the shaft 62, wherein rotation of camshaft 66 relative to the shaft 62 brings about the axial movement and actuates the selecting means 100 accordingly.

In another embodiment, both camshafts 64, 66 are of axially movable design, wherein the axial movement is caused by a rotary movement of the camshafts 64, 66 relative to the shaft 62.

Figure 9:
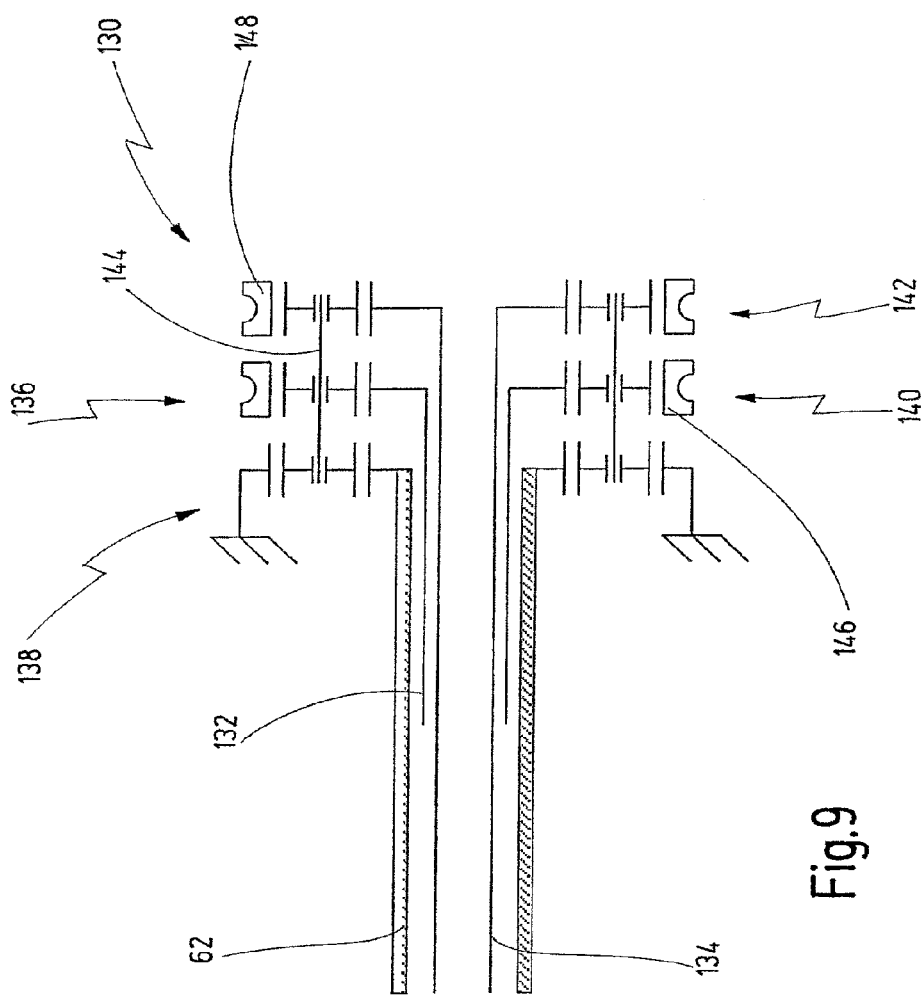
FIG. 9 shows a shifting device having two independently rotatable camshafts and a triple planetary transmission.

A shifting device having two independent camshafts is illustrated and designated in general by 130 in FIG. 9.

The shifting device 130 has the shaft 62 on which a plurality of loose wheels of the two partial transmissions 26, 28 are mounted. Respective camshafts 132, 134 are assigned to the partial transmissions 26, 28 and are designed to actuate the selecting means (not shown here) in order to selectively connect the loose wheels rotationally fixed to the shaft 62 and thus obtain different gear stages of the transmission unit 10. Arranged at one axial end of the shaft 62 is a speed superimposition transmission 136, which is connected both to the shaft 62 and to each of the camshafts 132, 134. The speed superimposition transmission 136 is arranged coaxially with the shaft 62. The speed superimposition transmission 136 has a transmission stage 138 and two control stages 140, 142. The transmission stage 138 is connected to the shaft 62 and the control stages 140, 142 are each connected to one of the camshafts 132, 134. The transmission stage 138 is formed by a first planetary transmission 138. The control stages 140, 142 are each formed by a planetary transmission 140, 142. The planetary transmissions 138, 140, 142 are of identical design to the corresponding planetary transmissions in FIG. 3. The planet wheels of the individual planetary transmissions 138, 140, 142 are connected to one another by means of a common planet carrier 144. The planetary transmission of the transmission stage 138 is connected to the shaft 62 and to a transmission housing (not shown). The control stages 140, 142 each have a pulley 146, 148, these being connected to the respective annuluses.

By virtue of the connection of the planet wheels of the planetary transmissions 138, 140, 142, the two camshafts 132, 134 are rotated synchronously with the shaft 62 when the pulleys 146, 148 are stationary. If one of the pulleys 146, 148 is rotated, the rotation or the corresponding angle of twist is transmitted to the respective camshaft 132 or 134. As a result, camshafts 132, 134 can be rotated independently of one another relative to the shaft 62, and the gear stages of the corresponding partial transmissions 26, 28 can be selected independently of one another. Moreover, an axially compact form of construction is thereby possible since the planetary transmission 138, 140, 142 is arranged at only one axial end.

The shifting device 130 has at least two of the control stages 140, 142. In a special embodiment, the shifting device 130 has three or more of the control stages 140, 142 in order to actuate separate selecting means.

Different loose wheels of the first and second partial transmissions 26, 28, together with the shifting device 60 from FIG. 3, are illustrated schematically in an axial direction of view in FIGS. 10a to d in order to elucidate the synchronization according to the invention of the two partial transmissions 26, 28.

Fundamentally, there is the problem, in the case of partial transmissions connected mechanically in series, that, when shifting via the highest gear of the first partial transmission 26, the first partial transmission is shifted to the lowest gear stage and, at the same time, a gear stage in the second partial transmission 28 is shifted to a higher gear stage. If the actual load changes or shifting times of the two partial transmissions 26, 28 do not take place simultaneously, the gear stage of the overall transmission unit is shifted briefly either to a very low gear or to a very high gear.

In the present example, the first partial transmission 26 has six gear stages and a second partial transmission 28 has three gear stages. If a shift is made from the sixth gear of the transmission unit 10 to the seventh gear, a shift is made from the sixth gear stage to the first gear stage in the first partial transmission 26 and, at the same time, from the first gear stage to the second gear stage in the second partial transmission 28. Similarly, a shift is made in the second partial transmission 28 from the second to the third gear stage when shifting from 12th to 13th gear. If the two partial transmissions 26, 28 do not shift fully simultaneously, a shift is made briefly either from sixth (or twelfth) gear to first (or seventh) gear, if the first partial gear 26 is shifted first, or from sixth (or twelfth) gear to twelfth (or eighteenth) gear, if the second partial transmission 28 is shifted first.

In FIGS. 10a to d, the loose wheels 38 and 43 of the sixth and first gear stages of the first partial transmission 26 and the loose wheels 48 and 49 of the first and second gear stages of the second partial transmission 28 are shown in the axial direction of view at four points in time during a shifting operation from sixth to seventh gear of the transmission unit 10.

The loose wheels each have internal toothing 149, in which one of the free-running clutch pawls 100 engages in order to connect the loose wheels rotationally fixed to the shaft 62. If one of the actuating portions 108, 118 of the camshafts 64, 66 is arranged underneath one of the actuating portions 101 of the selector pawls 100, the respective selector pawl 100 swivels out and engages in the internal toothing 149 of the loose wheels in order to connect them rotationally fixed to the shaft 62. If a sliding portion 106, 120 of the camshafts 64, 66 is arranged underneath the actuating portions 101, the respective selector pawl 100 is retracted and the corresponding loose wheel slides on the shaft 62. In FIG. 10a, the sixth gear of the transmission unit is engaged. In this case, the sixth gear stage of the first partial transmission 26 is engaged and the first gear stage of the second partial transmission 28 is engaged. In this case, the loose wheel 38 associated with the sixth gear stage is connected rotationally fixed to the shaft 62, and the loose wheel 43 associated to the first gear stage slides on the shaft 62. In the second partial transmission 28, the loose wheel 48 associated with the first gear stage is connected rotationally fixed to the shaft 62, and the loose wheel 49 associated with the second gear stage slides on the shaft 62.

In order to shift from the gear of the transmission unit 10 which has been engaged in this way to seventh gear, the camshafts 64, 66, which are connected for conjoint rotation, are rotated in the direction of arrow 150 until an "intermediate state" is achieved, which is shown in FIG. 10b.

In the intermediate state, both selector pawls of the first gear stage and of the sixth gear stage of the first partial transmission 26 are actuated or extended. In this state, the sixth gear stage is engaged, as indicated by a cross 152. In this intermediate state, the sixth gear stage remains engaged since, in this case, loose wheel 38 runs faster than loose wheel 43, with the result that loose wheel 43 slides across the selector pawl 100. The first camshaft 64 is rotated in the direction of the arrow 150 until it rests on the actuating portion 101 of the selector pawl of the sixth gear stage and exerts a corresponding force on the selector pawl 100. In this rotational position of the camshafts 64, 66, the selector pawl 100 of the first gear stage of the second partial transmission 28 is actuated or extended and the selector pawl 100 of the second gear stage of the second partial transmission 28 is retracted. If a driving forcer of the transmission unit 10 is reduced and the force exerted by camshaft 64 on the actuating portion 101 is sufficient to move the selector pawl 100 out of engagement with loose wheel 38, said selector pawl 100 retracts and, at the same time, loose wheel 43 is connected rotationally fixed to the shaft 62, and the first gear stage of the first partial transmission 26 is thereby engaged. By virtue of the fact that camshaft 64 is preloaded relative to the selector pawl 100 of loose wheel 38, a further rotation of the camshaft 64 is caused during the retraction of the selector pawl 100, thus canceling the intermediate state in FIG. 10b, as shown in FIG. 10c. In this state, the first gear stage is engaged in the first partial transmission, as indicated by the cross 152. At the same time, camshaft 66 together with camshaft 64 is rotated further by an angle of rotation of about 30°, with the result that the selector pawl 100 of loose wheel 49 is extended. Since the higher, second gear stage forms the faster running gear stage in the second partial transmission, the second gear stage is engaged immediately with the extension of the selector pawl 100, as indicated by a cross 154. At this time, therefore, the first gear stage is engaged in the first partial transmission 26 and the second gear stage is engaged in the second partial transmission 28, with the result that the seventh gear of the transmission unit 10 is engaged.

By virtue of the fact that the selector pawl 100 of loose wheel 38 initially prevents the camshafts from rotating further and, when the camshafts 64, 66 rotate further, the selector pawl 100 of loose wheel 49 connects loose wheel 49 immediately rotationally fixed to the shaft 62 due to the higher speed of rotation and, at the same time, the selector pawl 100 of loose wheel 43 connects the latter rotationally fixed to the shaft 62, there is simultaneous shifting in both partial transmissions 26, 28. In other words, the load change in the first partial transmission allows both camshafts 64, 66 to rotate further, causing an immediate shifting of the gear stages of the second partial transmission. As a result, the two partial transmissions 26, 28 are fully synchronized during the shift from the sixth to the seventh gear of the transmission unit 10.

In this shift state from FIG. 10c, the second partial transmission 28 is in an intermediate state in which both associated selector pawls are extended. Since loose wheel 49 is the fast running wheel, loose wheel 48 slides over the shaft 62.

If a shift is being made from seventh to eighth gear, a shift is then initially made to an intermediate state of the first partial transmission by actuating the selector pawls 100 of the first and second gear stages, thereby retracting the selector pawl 100 of loose wheel 48 of the first gear stage of the second partial transmission 28.

During a shifting operation from the seventh gear of the transmission unit 10 to the sixth gear, the first partial transmission 26 is consequently shifted from the first gear stage to the sixth gear stage, and the second partial transmission is simultaneously shifted from the second gear stage to the first gear stage. Conversely, for upshifting, the second partial transmission 28 is in this case initially shifted to an intermediate state by actuating or extending both corresponding selector pawls 100. Camshaft 66 is correspondingly preloaded against one of the selector pawls 100 and is released during a load change, with the result that camshaft 66 rotates further and causes an intermediate state in the first partial transmission 26. In this intermediate state, shifting or the load change is carried out immediately by the selectable freerunning clutches 100 and the rotational speeds of the corresponding loose wheels 38, 43. As a result, it is likewise possible to perform shifting synchronously and simultaneously in both partial transmissions 26, 28 when downshifting the transmission unit 10.

It is obvious that such synchronization of the two partial transmissions 26, 28 can be applied both to the shifting device 60 in FIG. 3 and to other shifting devices, such as camshafts which are capable only of rotation or camshafts which are capable only of axial movement. Moreover, the second partial transmission can also be designed as a shiftable planetary transmission or the like.

Figure 11A:
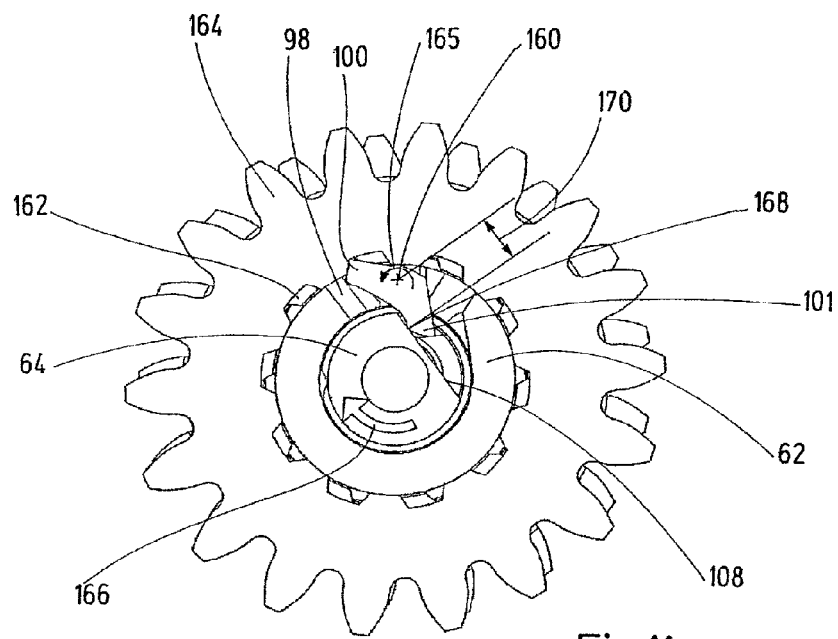
FIGS. 11a and b show a loose wheel in an axial direction of view intended to illustrate the actuation of the free-running clutch pawls.

The operation of the selector pawl 100 is explained in greater detail in FIGS. 11a and b. The selector pawl 100 is mounted in one of the recesses 98 in such a way as to be rotatable about an axis 160. The selector pawl 100 engages in internal toothing 162 of a loose wheel 164 in order to connect the loose wheel 164 rotationally fixed to the shaft 62. Camshaft 62 has the actuating portion 108, with the result that the selector pawl 100 retracts in a retraction rotation about the axis 160, as indicated at 165. Camshaft 64 is rotated in the direction of an arrow 166 counter to the extension direction 165 of the selector pawl 100, with the result that actuating portion 108 touches actuating portion 101 at a first contact point 168. By means of the rotation of camshaft 64, a torque is exerted on the selector pawl 100, retracting the selector pawl 100. The magnitude of the torque corresponds to the force which is exerted on the contact point 168 and to a lever arm 170 formed by the distance 170 between the contact point 168 and the axis of rotation 160.

Figure 11B:
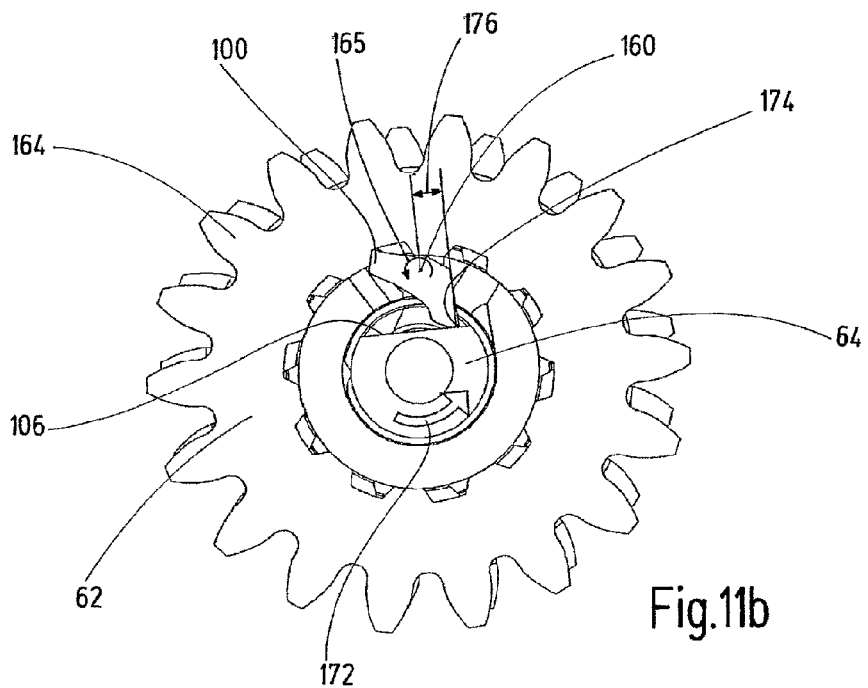

In FIG. 11b, a direction of rotation of camshaft 64 in the opposite direction is shown and is indicated by an arrow 172. This direction of rotation 172 is identical to the extension direction 165 of the selector pawl 100. In this direction of rotation, actuating portion 106 touches actuating portion 101 at a second contact point 174. The rotation of camshaft 64 exerts a torque on the selector pawl 100 corresponding to the force which is exerted on the contact point 174 and to a second lever arm 176 formed by a distance 176 between the second contact point and the axis of rotation 160.

The first lever arm 170 is consequently greater than the second lever arm 176, so that, during a rotation of camshaft 64 counter to a retraction direction 165 of the selector pawl 100, a larger torque is exerted on the selector pawl 100.

During shifting from a higher gear stage to a lower gear stage, the selector pawl 100 remains extended owing to the transmitted load and owing to the shift from a high speed to a low speed, and therefore shifting is generally not possible without a load reduction. By virtue of the fact that a larger torque is exerted on the selector pawl 100 in the case of a direction of rotation of camshaft 64 counter to the retraction direction 165, this rotation allows downshifting under load and under a higher load than in the case of the opposite direction of rotation of camshaft 64, as explained in greater detail in FIGS. 12a to f.

In FIGS. 12a to f, the loose wheels 42, 43 of the first gear and of the second gear are illustrated schematically and in an axial direction of view in order to illustrate shifting from the second gear to the first gear. In FIGS. 12a and b, the second gear is engaged, wherein the selector pawl 100 of the second gear is extended and the selector pawl 100 of the first gear is retracted. By turning camshaft 64 further in arrow direction 166, an intermediate state is achieved, in which the selector pawls of the two gears 1 and 2 are actuated. In this intermediate state, the faster running loose wheel 42, the loose wheel 42 of the second gear, is connected rotationally fixed to the shaft 62, while the loose wheel 43 of the first gear slides on the shaft 62. In the state in FIG. 12d, a force is exerted on the selector pawl 100 in order to retract the selector pawl 100, as already illustrated in FIG. 11a. As a result, retraction of the selector pawl 100 is brought about, as illustrated in FIG. 12f. As a result, the selector pawl 100 of the first gear engages in the internal toothing 162 of loose wheel 42, and therefore the first gear is engaged.

By means of the rotation of camshaft 64 during shifting from a higher to a lower gear stage counter to the retraction direction 165 of the selector pawls 100, it is thus possible to exert a larger torque on the selector pawl 100, thereby enabling the selector pawl 100 of the respectively higher gear to be moved out of engagement with the internal toothing 162, even under load or partial load. As a result, it is possible to downshift even under load.

The invention claimed is:

1. A shifting device for a transmission unit having a first partial transmission and a second partial transmission, which are connected in series for power transmission, wherein the first partial transmission has a shaft, which is formed as a hollow shaft and on which a plurality of loose wheels is mounted which form with a corresponding plurality of gearwheels wheel pairs of the first partial transmission, wherein the loose wheels can be connected to the shaft by means of selecting devices in order to form different gear stages of the first partial transmission, wherein the selecting devices can be actuated by a camshaft arranged in the shaft, wherein the selecting devices of the first partial transmission are designed as selectable free-running clutches, and wherein the second partial transmission has a plurality of selectable gear stages, wherein the camshaft is designed such that, during shifting from a highest stage of the gear stages of the first partial transmission to a lowest stage of the gear stages of the first partial transmission, the free-running clutches of the two gear stages are actuated simultaneously, and a load change between the corresponding free-running clutches allows a shifting operation of the second partial transmission to a higher stage of the gear stages.

2. A shifting device for a transmission unit having a first partial transmission and a second partial transmission, which are connected in series for power transmission, wherein the second partial transmission has a shaft, which is formed as a hollow shaft and on which a plurality of loose wheels is mounted which form with a corresponding plurality of gearwheels wheel pairs of the second partial transmission, wherein the loose wheels can be connected to the shaft by means of selecting devices in order to form different gear stages of the second partial transmission, wherein the selecting devices can be actuated by means of a camshaft arranged in the shaft, wherein the selecting devices of the second partial transmission are designed as selectable free-running clutches, and wherein the first partial transmission has a plurality of selectable gear stages, wherein the camshaft is designed such that, during shifting from a higher stage of the gear stages of the second partial transmission to a lower stage of the gear stages of the second partial transmission, the free-running clutches of the two gear stages are actuated simultaneously, and a load change between the corresponding free-running clutches allows a shifting operation of the first partial transmission from a lowest stage of the gear stages of the first partial transmission to a highest stage of the gear stages of the first partial transmission.

3. A shifting device for a transmission unit having a first partial transmission and a second partial transmission, which are connected in series for power transmission, wherein the first partial transmission has a shaft on which a plurality of loose wheels is mounted which form with a corresponding plurality of gearwheels wheel pairs of the first partial transmission, wherein the loose wheels can be connected to the shaft by means of selecting devices in order to form different gear stages of the first partial transmission, wherein the selecting devices can be actuated by means of a camshaft, wherein the selecting devices of the first partial transmission are designed as selectable free-running clutches, and wherein the second partial transmission has a plurality of selectable gear stages, wherein the camshaft is designed such that, the free-running clutches of two gear stages of the first partial transmission are actuated simultaneously, and a load change between the corresponding free-running clutches allows a shifting operation in the second partial transmission.

4. The shifting device as claimed in claim 3, wherein the load change initiates the shifting operation in the other of the partial transmissions in each case.

5. The shifting device as claimed in claim 3, wherein the camshaft in an intermediate state, in which the free-running clutches of the two gear stages of the first partial transmission or of the second partial transmission are actuated simultaneously, is preloaded against the corresponding free-running clutch and is released during the load change.

6. The shifting device as claimed in claim 3, wherein the second partial transmission is formed by a plurality of loose wheels, which are mounted on the shaft and form with a corresponding plurality of gearwheels wheel pairs of the second partial transmission, wherein the second partial transmission has a camshaft which can be rotated and/or moved axially in the shaft and is designed to perform a gear change in the second partial transmission during the load change.

7. The shifting device as claimed in claim 3, wherein the free-running clutches have swivelable pawls, which block the rotation of the camshaft in the intermediate state before the load change.

8. A shifting device for a transmission unit having a shaft, which is formed as a hollow shaft and on which a plurality of loose wheels is mounted which form with a corresponding plurality of gearwheels wheel pairs of different gear stages, wherein the loose wheels can be connected to the shaft by means of selectable free-running clutches, wherein the free-running clutches can be actuated selectively by a camshaft rotatably mounted in the hollow shaft, wherein the camshaft can be rotated in both directions of rotation relative to the shaft by means of a driving device in order to actuate the free-running clutches and move the free-running clutches out of engagement with the loose wheels, wherein the free-running clutches have selector pawls mounted rotatably or swivelably at the shaft, wherein the driving device are designed to rotate the camshaft for a change from a higher gear stage to a lower gear stage in a direction of rotation opposite to the direction of rotation of the selector pawls during disengagement.

9. A shifting device for a transmission unit having a shaft, on which a plurality of loose wheels is mounted which form with a corresponding plurality of gearwheels wheel pairs of two partial transmissions, wherein the shaft is formed as a hollow shaft and the loose wheels are connectable to the shaft by means of selecting devices, wherein the two partial transmissions are assigned in each case one camshaft which is mounted in the hollow shaft, and the selecting devices can be actuated selectively by means of the camshafts, wherein the camshafts are connected to a driving device in order to rotate the camshafts relative to the shaft to actuate the selecting devices, wherein the camshafts are connected rotationally fixed to one another, and a rotation of the camshafts relative to the shaft causes an axial movement of one of the camshafts.

10. The shifting device as claimed in claim 9, wherein the axially movable second camshaft has an at least partially circumferential groove having a transverse portion, in which a pin engages, which is connected to the shaft, wherein the transverse portion causes the axial movement at a predefined rotational position of the camshafts.

11. The shifting device as claimed in claim 9, wherein the axially movable camshaft has at least one cam portion, having an actuating portion for actuating the selecting devices by rotation of the camshaft, and an at least partially circumferential sliding portion for maintaining the shift state of the selecting devices over a predefined rotation angle.

12. The shifting device as claimed in claim 9, wherein the actuating portion and the sliding portion adjoin one another in the direction of rotation.

13. The shifting device as claimed in claim 9, wherein the selecting devices, the cam portion and the groove are arranged in such a way that the selecting devices of different gear stages can be actuated by the cam portion.

14. The shifting device as claimed in 11, wherein the sliding portion is designed to completely encircle the camshaft in order to maintain a corresponding shift state over a complete revolution of the camshaft.

15. A shifting device for a transmission unit having a shaft, on which a plurality of loose wheels is mounted which form with a corresponding plurality of gearwheels wheel pairs of two partial transmissions, wherein the shaft is formed as a hollow shaft and the loose wheels are connectable to the shaft by means of selecting devices, wherein the two partial transmissions are assigned in each case one camshaft which is mounted in the hollow shaft, and the selecting devices can be actuated selectively by means of the camshafts, wherein the camshafts are connected to a driving device in order to rotate the camshafts relative to the shaft to actuate the selecting devices, wherein a first of the camshafts is connected to the driving device through a second of the camshafts by means of a drive shaft.

16. The shifting device as claimed in claim 15, wherein the driving device of both camshafts are arranged at one axial end of the shaft.

17. The shifting device as claimed in claim 15, wherein the driving device have a speed superimposition transmission.

18. The shifting device as claimed in claim 15, wherein the driving device have two or more planetary transmissions, which are connected to one another.

19. The shifting device as claimed in claim 18, wherein planet carriers of the planetary transmissions are connected to one another.

20. The shifting device as claimed in claim 15, wherein the driving device are designed to rotate the camshaft or camshafts synchronously with the shaft in order to maintain a shift state and to rotate at least one of the camshafts relative to the shaft in order to change a shift state.

21. The shifting device as claimed in claim 9, wherein the camshafts are connected to one another rotationally fixed and axially movable by means of a connecting shaft.

22. The shifting device as claimed in claim 9, wherein the driving device have a transmission stage to transmit the rotation of the shaft to the camshafts, and wherein the driving device have two control stages to separately transmit a relative rotation to the respective camshafts.

* * * * *